(12) United States Patent
Haltiner, Jr. et al.

(10) Patent No.: US 10,082,054 B2
(45) Date of Patent: Sep. 25, 2018

(54) CAMSHAFT PHASER

(71) Applicant: DELPHI TECHNOLOGIES IP LIMITED, St. Michael (BB)

(72) Inventors: Karl J. Haltiner, Jr., Fairport, NY (US); Thomas H. Fischer, Rochester, NY (US)

(73) Assignee: DELPHI TECHNOLOGIES IP LIMITED (BB)

( * ) Notice: Subject to any disclaimer, the term of this patent is extended or adjusted under 35 U.S.C. 154(b) by 372 days.

(21) Appl. No.: 14/936,888

(22) Filed: Nov. 10, 2015

(65) Prior Publication Data
US 2017/0130617 A1 May 11, 2017

(51) Int. Cl.
*F01L 1/344* (2006.01)
*F01L 1/047* (2006.01)
*F16K 15/14* (2006.01)

(52) U.S. Cl.
CPC ............. *F01L 1/3442* (2013.01); *F01L 1/047* (2013.01); *F16K 15/14* (2013.01); *F01L 2001/34423* (2013.01); *F01L 2001/34426* (2013.01); *F01L 2001/34433* (2013.01)

(58) Field of Classification Search
CPC ........... F01L 1/3442; F01L 2001/34426; F01L 2001/34433
USPC ............ 137/625.65, 625.25, 625.67, 625.69, 137/625.34, 625.35
See application file for complete search history.

(56) References Cited

U.S. PATENT DOCUMENTS

| | | |
|---|---|---|
| 6,772,721 B1 | 8/2004 | Gardner et al. |
| 6,814,038 B2 | 11/2004 | Smith |
| 7,000,580 B1 | 2/2006 | Smith et al. |
| 7,137,371 B2 | 11/2006 | Simpson et al. |
| 7,198,013 B2 | 4/2007 | Palesch et al. |
| 7,389,756 B2 | 6/2008 | Hoppe et al. |
| 7,600,531 B2 | 10/2009 | Patze et al. |
| 8,534,246 B2 | 9/2013 | Lichti et al. |
| 8,684,041 B2 | 4/2014 | Konias et al. |
| 8,733,305 B2 | 5/2014 | Scheidig |
| 8,733,308 B2 | 5/2014 | Racklebe et al. |
| 9,587,526 B2 | 3/2017 | Lichti |
| 9,587,527 B2 | 3/2017 | Lichti |
| 2006/0225791 A1 | 10/2006 | Patze et al. |
| 2008/0236529 A1 | 10/2008 | Scheidig et al. |

(Continued)

FOREIGN PATENT DOCUMENTS

| | | |
|---|---|---|
| DE | 102010005604 A1 | 7/2011 |
| EP | 1447602 A1 | 8/2004 |

*Primary Examiner* — Mark Laurenzi
*Assistant Examiner* — Wesley Harris
(74) *Attorney, Agent, or Firm* — Joshua M. Haines

(57) ABSTRACT

A camshaft phaser includes an input member and an output member defining an advance chamber and a retard chamber; a valve spool moveable along an axis between an advance position and a retard position and having a valve spool bore with a phasing volume and a venting volume defined therein such that the phasing volume is fluidly segregated from the venting volume, the valve spool having a first spool supply passage and a second spool supply passage which is diametrically opposed to the first spool recirculation passage. The first spool supply passage and the second spool supply passage each provide a path for pressurized oil to be supplied to the phasing volume from an oil source.

21 Claims, 16 Drawing Sheets

(56) References Cited

U.S. PATENT DOCUMENTS

2013/0199469 A1* 8/2013 Busse .................... F16K 11/07
                                                            123/90.15
2013/0206088 A1   8/2013 Wigsten
2014/0157980 A1   6/2014 Hilite

* cited by examiner

CAMSHAFT PHASER

TECHNICAL FIELD OF INVENTION

The present invention relates to a camshaft phaser for varying the phase relationship between a crankshaft and a camshaft in an internal combustion engine; more particularly to such a camshaft phaser which is a vane-type camshaft phaser; even more particularly to a vane-type camshaft phaser which includes a centrally located valve spool to direct oil which is used to alter the phase relationship.

BACKGROUND OF INVENTION

A typical vane-type camshaft phaser for changing the phase relationship between a crankshaft and a camshaft of an internal combustion engine generally comprises a plurality of outwardly-extending vanes on a rotor interspersed with a plurality of inwardly-extending lobes on a stator, forming alternating advance and retard chambers between the vanes and lobes. Engine oil is selectively supplied to one of the advance and retard chambers and vacated from the other of the advance and retard chambers by a phasing oil control valve in order to rotate the rotor within the stator and thereby change the phase relationship between the camshaft and the crankshaft. A supply check valve is typically provided in order to prevent oil from flowing back to the source of the engine oil. It is also common to include a lock pin which is selectively engaged and disengaged with a lock pin seat. When the lock pin is engaged with the lock pin seat, rotation of the rotor relative to the stator is prevented. Conversely, when the lock pin is disengaged from the lock pin, rotation of the rotor relative to the stator is permitted based on input from the phasing oil control valve. One such camshaft phaser is described in U.S. Pat. No. 6,772,721 to Gardner et al., hereinafter referred to as Gardner et al. While the camshaft phaser of Gardner et al. may be effective, it may be difficult to implement the check valve within the rotor as taught by Gardner et al. In order to achieve compactness and simplify oil passages, it may be desirable to implement the check valve within the valve spool.

What is needed is camshaft phaser which minimizes or eliminates one or more the shortcomings as set forth above.

SUMMARY OF THE INVENTION

Briefly described, a camshaft phaser is provided for use with an internal combustion engine for controllably varying the phase relationship between a crankshaft and a camshaft in the internal combustion engine. The camshaft phaser includes an input member connectable to the crankshaft of the internal combustion engine to provide a fixed ratio of rotation between the input member and the crankshaft; an output member connectable to the camshaft of the internal combustion engine and defining an advance chamber and a retard chamber with the input member; and a valve spool moveable along an axis between an advance position and a retard position and having a valve spool bore with a phasing volume and a venting volume defined within the valve spool bore such that the phasing volume is fluidly segregated from the venting volume, the valve spool having a first spool supply passage and a second spool supply passage which is diametrically opposed to the first spool supply passage such that the first spool supply passage and the second spool supply passage each provide a path for pressurized oil to be supplied to the phasing volume from an oil source. Oil is supplied to the advance chamber from the phasing volume and oil is vented from the retard chamber to the venting volume in order to retard the timing of the camshaft relative to the crankshaft and oil is supplied to the retard chamber from the phasing volume and oil is vented from the advance chamber to the venting volume in order to advance the timing of the camshaft relative to the crankshaft. The diametrically opposing spool supply passages accommodate greater oil flow, thereby increasing the phasing rate, i.e. the rate at which the timing of the camshaft relative to the crankshaft is advanced or retarded. The diametrically opposing spool recirculation passages also accommodate a check valve associated with the spool supply passages that is simple and economical to implement.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

This invention will be further described with reference to the accompanying drawings in which:

FIGS. 11 and 12 are isometric cross-sectional views of the valve spool and the insert of the camshaft phaser in accordance with the present invention;

DETAILED DESCRIPTION OF INVENTION

Figure 1:
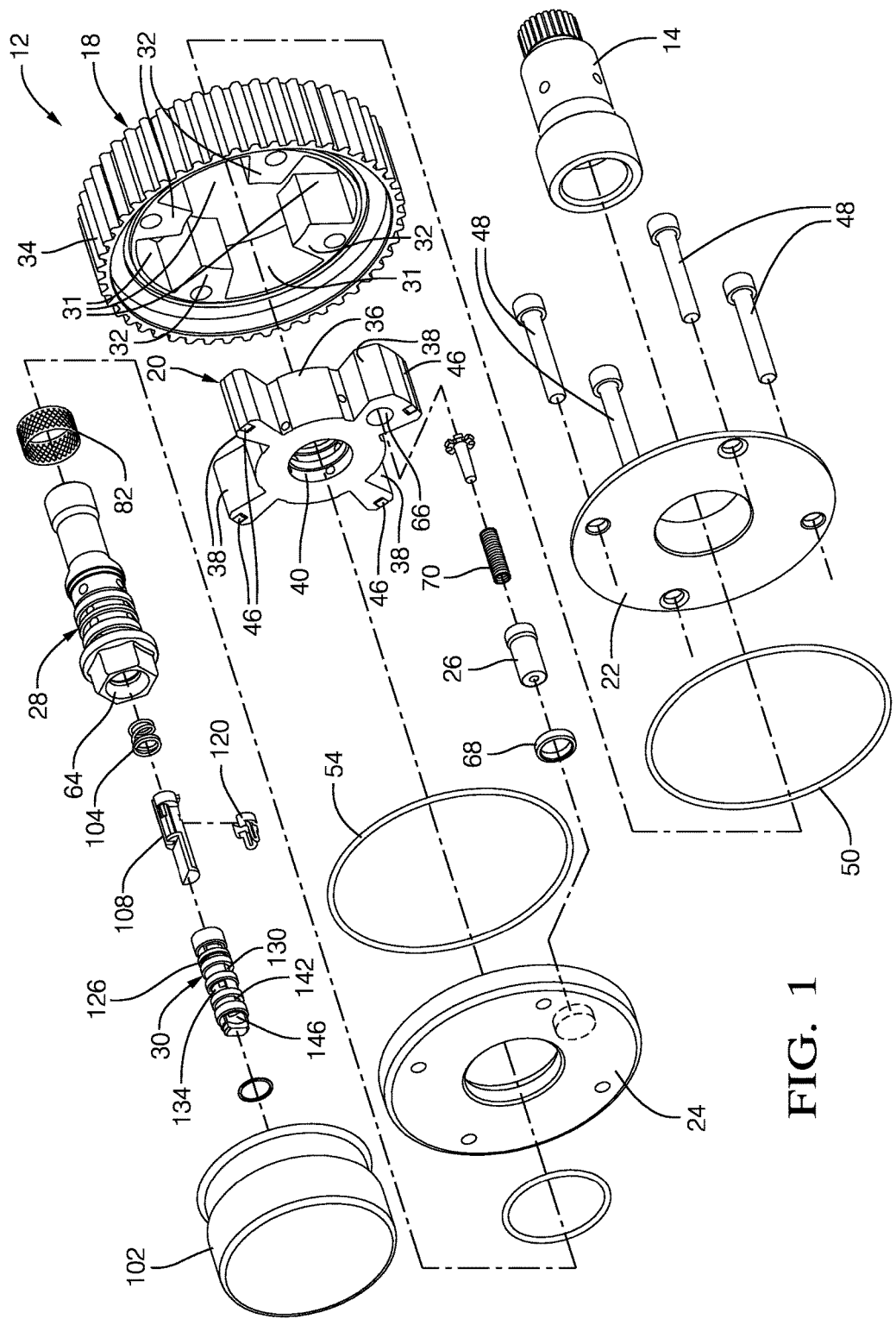
FIG. 1 is an exploded isometric view of a camshaft phaser in accordance with the present invention.

In accordance with a preferred embodiment of this invention and referring to FIGS. 1-4, an internal combustion engine 10 is shown which includes a camshaft phaser 12. Internal combustion engine 10 also includes a camshaft 14 which is rotatable about a camshaft axis 16 based on rotational input from a crankshaft and belt (not shown) driven by a plurality of reciprocating pistons (also not shown). As camshaft 14 is rotated, it imparts valve lifting and closing motion to intake and/or exhaust valves (not shown) as is well known in the internal combustion engine art. Camshaft phaser 12 allows the timing between the crankshaft and camshaft 14 to be varied. In this way, opening and closing of the intake and/or exhaust valves can be advanced or retarded in order to achieve desired engine performance.

Camshaft phaser 12 generally includes a stator 18 which acts and an input member, a rotor 20 disposed coaxially within stator 18 which acts as an output member, a back cover 22 closing off one end of stator 18, a front cover 24 closing off the other end of stator 18, a lock pin 26, a camshaft phaser attachment bolt 28 for attaching camshaft phaser 12 to camshaft 14, and a valve spool 30. The various elements of camshaft phaser 12 will be described in greater detail in the paragraphs that follow.

Stator 18 is generally cylindrical and includes a plurality of radial chambers 31 defined by a plurality of lobes 32 extending radially inward. In the embodiment shown, there are four lobes 32 defining four radial chambers 31, however, it is to be understood that a different number of lobes 32 may be provided to define radial chambers 31 equal in quantity to the number of lobes 32. Stator 18 may also include a toothed pulley 34 formed integrally therewith or otherwise fixed thereto. Pulley 34 is configured to be driven by a belt that is driven by the crankshaft of internal combustion engine 10. Alternatively, pulley 34 may be a sprocket driven by a chain or any other known drive member known for driving camshaft phaser 12 by the crankshaft.

Rotor 20 includes a central hub 36 with a plurality of vanes 38 extending radially outward therefrom and a rotor central through bore 40 extending axially therethrough. The number of vanes 38 is equal to the number of radial chambers 31 provided in stator 18. Rotor 20 is coaxially disposed within stator 18 such that each vane 38 divides each radial chamber 31 into advance chambers 42 and retard chambers 44. The radial tips of lobes 32 are mateable with central hub 36 in order to separate radial chambers 31 from each other. Each of the radial tips of vanes 38 may include one of a plurality of wiper seals 46 to substantially seal adjacent advance chambers 42 and retard chambers 44 from each other. While not shown, each of the radial tips of lobes 32 may also include one of a plurality of wiper seals 46.

Back cover 22 is sealingly secured, using cover bolts 48, to the axial end of stator 18 that is proximal to camshaft 14. Tightening of cover bolts 48 prevents relative rotation between back cover 22 and stator 18. A back cover seal 50, for example only, an O-ring, may be provided between back cover 22 and stator 18 in order to provide an oil-tight seal between the interface of back cover 22 and stator 18. Back cover 22 includes a back cover central bore 52 extending coaxially therethrough. The end of camshaft 14 is received coaxially within back cover central bore 52 such that camshaft 14 is allowed to rotate relative to back cover 22. In an alternative arrangement, pulley 34 may be integrally formed or otherwise attached to back cover 22 rather than stator 18.

Similarly, front cover 24 is sealingly secured, using cover bolts 48, to the axial end of stator 18 that is opposite back cover 22. A front cover seal 54, for example only, an O-ring, may be provided between front cover 24 and stator 18 in order to provide an oil-tight seal between the interface of front cover 24 and stator 18. Cover bolts 48 pass through back cover 22 and stator 18 and threadably engage front cover 24, thereby clamping stator 18 between back cover 22 and front cover 24 to prevent relative rotation between stator 18, back cover 22, and front cover 24. In this way, advance chambers 42 and retard chambers 44 are defined axially between back cover 22 and front cover 24.

Camshaft phaser 12 is attached to camshaft 14 with camshaft phaser attachment bolt 28 which extends coaxially through rotor central through bore 40 of rotor 20 and threadably engages camshaft 14, thereby by clamping rotor 20 securely to camshaft 14. In this way, relative rotation between stator 18 and rotor 20 results in a change is phase or timing between the crankshaft of internal combustion engine 10 and camshaft 14.

Pressurized oil is selectively supplied to advance chambers 42 from an oil source 55, which may be an oil pump of internal combustion engine 10, while oil is simultaneously vented from retard chambers 44 in order to cause relative rotation between stator 18 and rotor 20 which results in retarding the timing of camshaft 14 relative to the crankshaft of internal combustion engine 10. Conversely, pressurized oil is selectively supplied to retard chambers 44 from oil source 55 while oil is simultaneously vented from advance chambers 42 in order to cause relative rotation between stator 18 and rotor 20 which results in advancing the timing of camshaft 14 relative to the crankshaft of internal combustion engine 10. Rotor advance passages 56 may be provided in rotor 20 for supplying and venting oil to and from advance chambers 42 while rotor retard passages 58 may be provided in rotor 20 for supplying and venting oil to and from retard chambers 44. Supplying and venting oil to and from advance chambers 42 and to and from retard chambers 44 is controlled by valve spool 30, as will be described in detail later, such that valve spool 30 is coaxially disposed slidably within a valve bore 64 of camshaft phaser attachment bolt 28 where valve bore 64 is centered about camshaft axis 16.

Lock pin 26 selectively prevents relative rotation between stator 18 and rotor 20 at a predetermined aligned position of rotor 20 within stator 18, which as shown, may be a full advance position, i.e. rotor 20 as far as possible within stator 18 in the advance direction of rotation. Lock pin 26 is slidably disposed within a lock pin bore 66 formed in one vane 38 of rotor 20. A lock pin seat 68 is provided in front cover 24 for selectively receiving lock pin 26 therewithin. Lock pin 26 and lock pin seat 68 are sized to substantially prevent rotation between stator 18 and rotor 20 when lock pin 26 is received within lock pin seat 68. When lock pin 26 is not desired to be seated within lock pin seat 68, pressurized oil is supplied to lock pin bore 66 through a rotor lock pin passage 72 formed in rotor 20, thereby urging lock pin 26 out of lock pin seat 68 and compressing a lock pin spring 70. Conversely, when lock pin 26 is desired to be seated within lock pin seat 68, the pressurized oil is vented from lock pin bore 66 through rotor lock pin passage 72, thereby allowing lock pin spring 70 to urge lock pin 26 toward front cover 24. In this way, lock pin 26 is seated within lock pin seat 68 by lock pin spring 70 when rotor 20 is positioned within stator 18 to allow alignment of lock pin 26 with lock pin seat 68. Supplying and venting of pressurized oil to and from lock pin 26 is controlled by valve spool 30 as will be described later.

Camshaft phaser attachment bolt 28 and valve spool 30, which act together to function as a valve, will now be described in greater detail with continued reference to FIGS. 1-4 and now with additional reference to FIGS. 5A-14. Camshaft phaser attachment bolt 28 includes bolt supply passages 74 which extend radially outward from valve bore 64 to the outside surface of camshaft phaser attachment bolt 28. Bolt supply passages 74 receive pressurized oil from oil source 55 via an annular oil supply passage 78 formed radially between camshaft phaser attachment bolt 28 and a counter bore of camshaft 14 and also via radial camshaft oil passages 80 of camshaft 14. The pressurized oil from oil source 55 is used to 1) selectively supply oil to advance chambers 42, 2) selectively supply oil to retard chambers 44, and 3) selectively disengage lock pin 26 from lock pin seat 68. A filter 82 may circumferentially surround camshaft phaser attachment bolt 28 at bolt supply passages 74 in order to prevent foreign matter that may be present in the oil from reaching valve spool 30.

Camshaft phaser attachment bolt 28 also includes a bolt annular lock pin groove 84 on the outer periphery of camshaft phaser attachment bolt 28 and bolt lock pin passages 86 extend radially outward from valve bore 64 to bolt annular lock pin groove 84. Bolt annular lock pin groove 84 is spaced axially apart from bolt supply passages 74 in a direction away from camshaft 14 and is aligned with a rotor annular lock pin groove 88 which extends radially outward from rotor central through bore 40 such that rotor lock pin passage 72 extends from rotor annular lock pin groove 88 to lock pin bore 66. In this way, fluid communication is provided between valve bore 64 and lock pin bore 66.

Camshaft phaser attachment bolt 28 also includes a bolt annular advance groove 90 on the outer periphery of camshaft phaser attachment bolt 28 and bolt advance passages 92 extend radially outward from valve bore 64 to bolt annular advance groove 90. Bolt annular advance groove 90 is spaced axially apart from bolt supply passages 74 and bolt annular lock pin groove 84 such that bolt annular lock pin groove 84 is axially between bolt supply passages 74 and bolt annular advance groove 90. Bolt annular advance groove 90 is aligned with a rotor annular advance groove 94 which extends radially outward from rotor central through bore 40 such that rotor advance passages 56 extend from rotor annular advance groove 94 to advance chambers 42. In this way, fluid communication is provided between valve bore 64 and advance chambers 42.

Camshaft phaser attachment bolt 28 also includes a bolt annular retard groove 96 on the outer periphery of camshaft phaser attachment bolt 28 and bolt retard passages 98 extend radially outward from valve bore 64 to bolt annular retard groove 96. Bolt annular retard groove 96 is spaced axially apart from bolt annular advance groove 90 such that bolt annular advance groove 90 is axially between bolt annular lock pin groove 84 and bolt annular retard groove 96. Bolt annular retard groove 96 and is aligned with a rotor annular retard groove 100 which extends radially outward from rotor central through bore 40 such that rotor retard passages 58 extend from rotor annular retard groove 100 to retard chambers 44. In this way, fluid communication is provided between valve bore 64 and retard chambers 44.

Valve spool 30 is moved axially along camshaft axis 16 within valve bore 64 of camshaft phaser attachment bolt 28 by an actuator 102 and a valve spring 104 to achieve desired operational states of camshaft phaser 12 by opening and closing bolt supply passages 74, bolt lock pin passages 86, bolt advance passages 92, and bolt retard passages 98 as will now be described. Valve spool 30 includes a valve spool bore 106 extending axially thereinto from the end of valve spool 30 that is proximal to camshaft 14. An insert 108 is disposed within valve spool bore 106 such that insert 108 defines a phasing volume 110 and a venting volume 112 (best visible in FIG. 11) such that phasing volume 110 is substantially fluidly segregated from venting volume 112, i.e. phasing volume 110 does not communicate with venting volume 112. By way of non-limiting example only, insert 108 may be net-formed by plastic injection molding and may be easily inserted within valve spool bore 106 from the end of valve spool bore 106 that is proximal to valve spring 104 prior to valve spool 30 being inserted into valve bore 64 of camshaft phaser attachment bolt 28. In this way, phasing volume 110 and venting volume 112 are easily and economically formed.

Valve spool 30 also includes a supply land 114 which is sized to fit within valve bore 64 in a close sliding relationship such that oil is substantially prevented from passing between the interface between supply land 114 and valve bore 64 while allowing valve spool 30 to be displaced axially within valve bore 64 substantially uninhibited.

Valve spool 30 also includes a spool annular supply groove 116 that is axially adjacent to supply land 114. A spool supply passage 118a and a spool supply passage 118b are provided such that spool supply passage 118a and spool supply passage 118b each extend radially inward from spool annular supply groove 116 to phasing volume 110 within valve spool bore 106 and such that spool supply passage 118a is diametrically opposed to spool supply passage 118b. Spool supply passage 118a and spool supply passage 118b are both preferably slots which extend in a circumferential direction about camshaft axis 16 further than in the direction of camshaft axis 16. A supply check valve 120 is disposed within phasing volume 110, as will be described in greater detail later, in order to allow oil to enter phasing volume 110 from spool supply passage 118a and from spool supply passage 118b while substantially preventing oil from exiting phasing volume 110 to spool supply passage 118a and to spool supply passage 118b.

Valve spool 30 also includes a lock pin land 122 that is axially adjacent to spool annular supply groove 116. Lock pin land 122 is sized to fit within valve bore 64 in a close sliding relationship such that oil is substantially prevented from passing between the interface between lock pin land 122 and valve bore 64 while allowing valve spool 30 to be displaced axially within valve bore 64 substantially uninhibited. Lock pin land 122 is axially divided by an spool annular lock pin groove 124 such that a spool lock pin passage 126 (best visible in FIG. 14) extends radially inward from spool annular lock pin groove 124 to venting volume 112 within valve spool bore 106, thereby providing fluid communication between spool annular lock pin groove 124 and venting volume 112.

Valve spool 30 also includes a spool annular advance groove 128 that is axially adjacent to lock pin land 122. A spool advance passage 130 is provided which extends radially inward from spool annular advance groove 128 to phasing volume 110 within valve spool bore 106 in order to provide fluid communication between spool annular advance groove 128 and phasing volume 110. Spool advance passage 130 is preferably a slot which extends in a circumferential direction about camshaft axis 16 further than in the direction of camshaft axis 16 and preferably extends circumferentially about half of the way around spool annular advance groove 128.

Valve spool 30 also includes an advance land 131 that is axially adjacent to spool annular advance groove 128. Advance land 131 is sized to fit within valve bore 64 in a close sliding relationship such that oil is substantially prevented from passing between the interface between advance land 131 and valve bore 64 while allowing valve spool 30 to be displaced axially within valve bore 64 substantially uninhibited.

Valve spool 30 also includes a spool annular vent groove 132 that is axially adjacent to advance land 131. A spool vent passage 134 (best visible in FIGS. 12 and 14) is provided such that spool vent passage 134 extends radially inward from spool annular vent groove 132 to phasing volume 110 within valve spool bore 106. Spool vent passage 134 is preferably a slot which extends in a circumferential direction about camshaft axis 16 further than in the direction of camshaft axis 16 and preferably extends circumferentially about half of the way around spool annular vent groove 132.

Valve spool 30 also includes a retard land 138 that is axially adjacent to spool annular vent groove 132. Retard land 138 is sized to fit within valve bore 64 in a close sliding relationship such that oil is substantially prevented from passing between the interface between retard land 138 and valve bore 64 while allowing valve spool 30 to be displaced axially within valve bore 64 substantially uninhibited.

Valve spool 30 also includes a spool annular retard groove 140 that is axially adjacent to retard land 138. A spool retard passage 142 is provided such that spool retard passage 142 extends radially inward from spool annular retard groove 140 to phasing volume 110 within valve spool bore 106 in order to provide fluid communication between spool annular retard groove 140 and phasing volume 110. Spool retard passage 142 is preferably a slot which extends in a circumferential direction about camshaft axis 16 further than in the direction of camshaft axis 16 and preferably extends circumferentially about half of the way around spool annular retard groove 140.

Valve spool 30 also includes an end land 144 that is axially adjacent to spool annular retard groove 140. End land 144 is sized to fit within valve bore 64 in a close sliding relationship such that oil is substantially prevented from passing between the interface between end land 144 and valve bore 64 while allowing valve spool 30 to be displaced axially within valve bore 64 substantially uninhibited.

Valve spool 30 also includes vent passages 146 which extend radially outward from venting volume 112, thereby allowing oil within venting volume 112 to be vented to valve bore 64 and out of camshaft phaser 12 where it may be drained back to oil source 55. Alternatively, a passage could be formed in camshaft phaser attachment bolt 28 which extends from valve bore 64 to a drain passage in camshaft 14 in order to vent oil within venting volume 112 where it may be drained back to oil source 55.

Figure 5A:
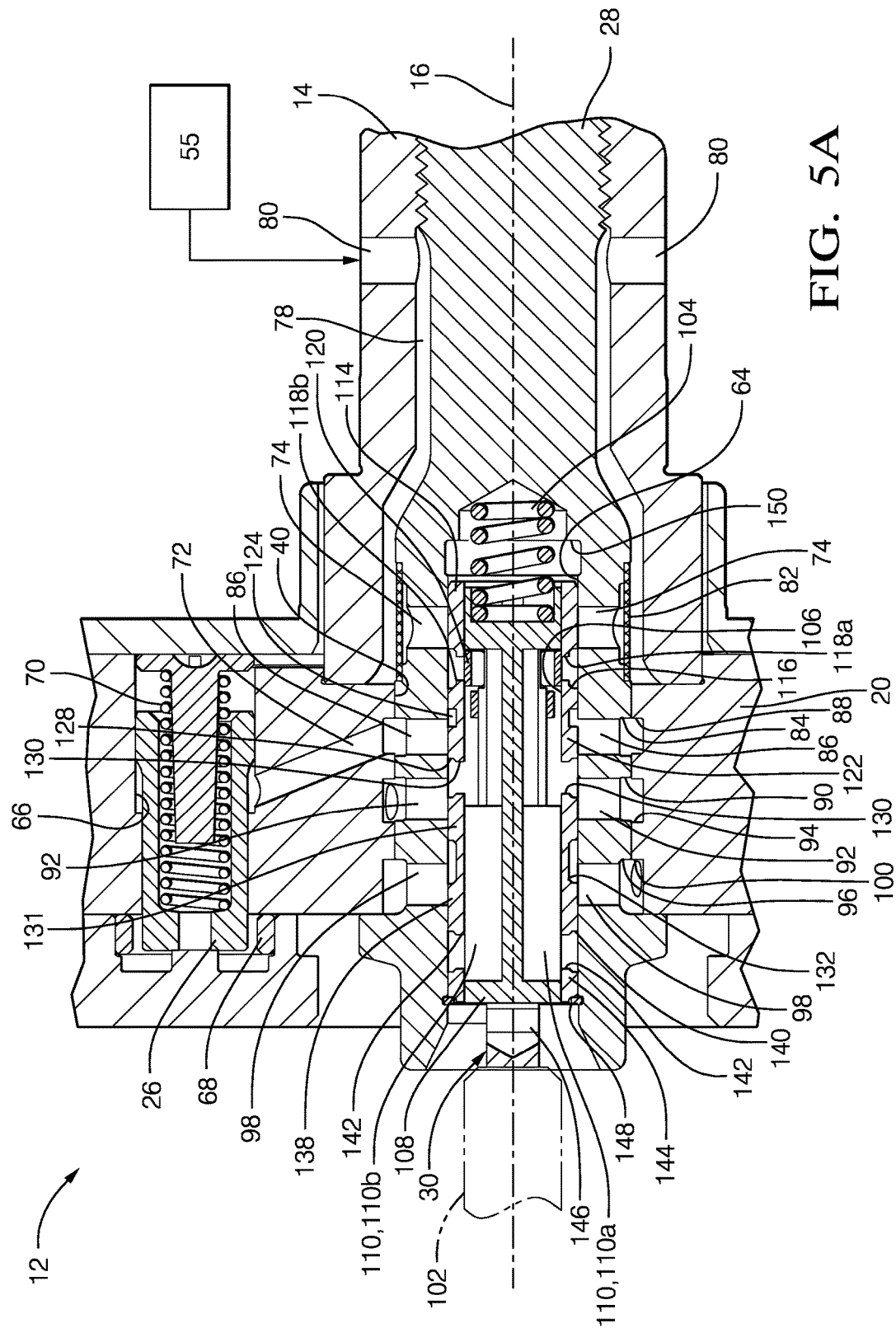
FIG. 5A is an enlarged portion of FIG. 4 showing a valve spool of the camshaft phaser in a default position with a lock pin engaged with a lock pin seat.
Figure 5B:
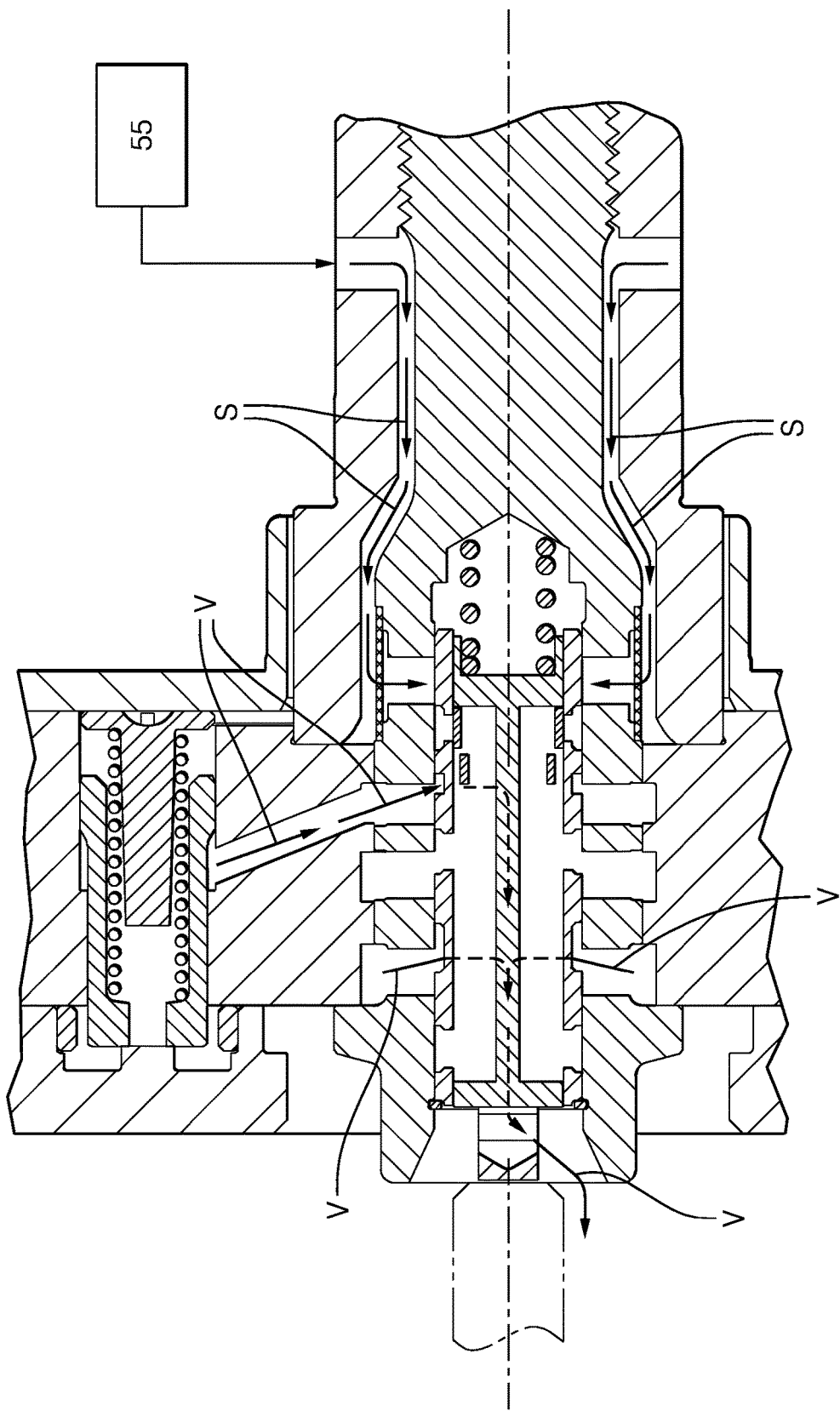
FIG. 5B is the view of FIG. 5A shown with reference numbers removed in order to clearly shown the path of travel of oil.

Actuator 102 may be a solenoid actuator that is selectively energized with an electric current of varying magnitude in order to position valve spool 30 within valve bore 64 at desired axial positions, thereby controlling oil flow to achieve desired operation of camshaft phaser 12. In a default position, when no electric current is supplied to actuator 102 as shown in FIGS. 5A and 5B, valve spring 104 urges valve spool 30 in a direction toward actuator 102 until valve spool 30 axially abuts a first stop member 148, which may be, by way of non-limiting example only, a snap ring within a snap ring groove extending radially outward from valve bore 64.

In the default position, supply land 114 is positioned to provide fluid communication between bolt supply passages 74 and spool annular supply groove 116, thereby allowing pressurized oil to be supplied to phasing volume 110 through spool supply passages 118a,118b and supply check valve 120 from oil source 55. Also in the default position, lock pin land 122 is positioned to align spool annular lock pin groove 124 with bolt lock pin passages 86, thereby allowing oil to be vented from lock pin bore 66 via rotor lock pin passage 72, rotor annular lock pin groove 88, bolt annular lock pin groove 84, bolt lock pin passages 86, spool annular lock pin groove 124, spool lock pin passage 126, venting volume 112, and vent passages 146 and consequently allowing lock pin spring 70 to urge lock pin 26 toward front cover 24. In the default position, lock pin land 122 also blocks fluid communication between bolt lock pin passages 86 and phasing volume 110. Also in the default position, advance land 131 is positioned to block fluid communication between bolt advance passages 92 and spool annular vent groove 132 while simultaneously permitting fluid communication between bolt advance passages 92 and phasing volume 110 via spool annular advance groove 128 and spool advance passage 130. Also in the default position, retard land 138 is positioned to block fluid communication between phasing volume 110 and bolt retard passages 98 while simultaneously permitting fluid communication between bolt retard passages 98 and venting volume 112 via spool annular vent groove 132, and spool vent passage 134. In this way, pressurized oil that is supplied to phasing volume 110 from oil source 55 is supplied to advance chambers 42 via spool advance passage 130, spool annular advance groove 128, bolt advance passages 92, bolt annular advance groove 90, rotor annular advance groove 94, and rotor advance passages 56 while oil is simultaneously vented from retard chambers 44 via rotor retard passages 58, rotor annular retard groove 100, bolt annular retard groove 96, bolt retard passages 98, spool annular vent groove 132, spool vent passage 134, venting volume 112, and vent passages 146, thereby causing rotor 20 to rotate relative to stator 18 to cause a retard in timing of camshaft 14 relative to the crankshaft, and when lock pin 26 is aligned with lock pin seat 68, lock pin spring 70 urges lock pin 26 into lock pin seat 68 to retain rotor 20 in the predetermined aligned position with stator 18. In FIG. 5B, the reference numbers have been removed for clarity and arrows representing the path of travel of the oil have been included where arrows S represent oil from oil source 55 that is supplied to advance chambers 42 and arrows V represent vented oil from lock pin bore 66 and from retard chambers 44. It should be noted that FIG. 5B shows supply check valve 120 being open, but supply check valve 120 may also be closed if a torque reversal acting on camshaft 14 causes the pressure within phasing volume 110 to be greater than the pressure of oil from oil source 55.

Figure 6A:
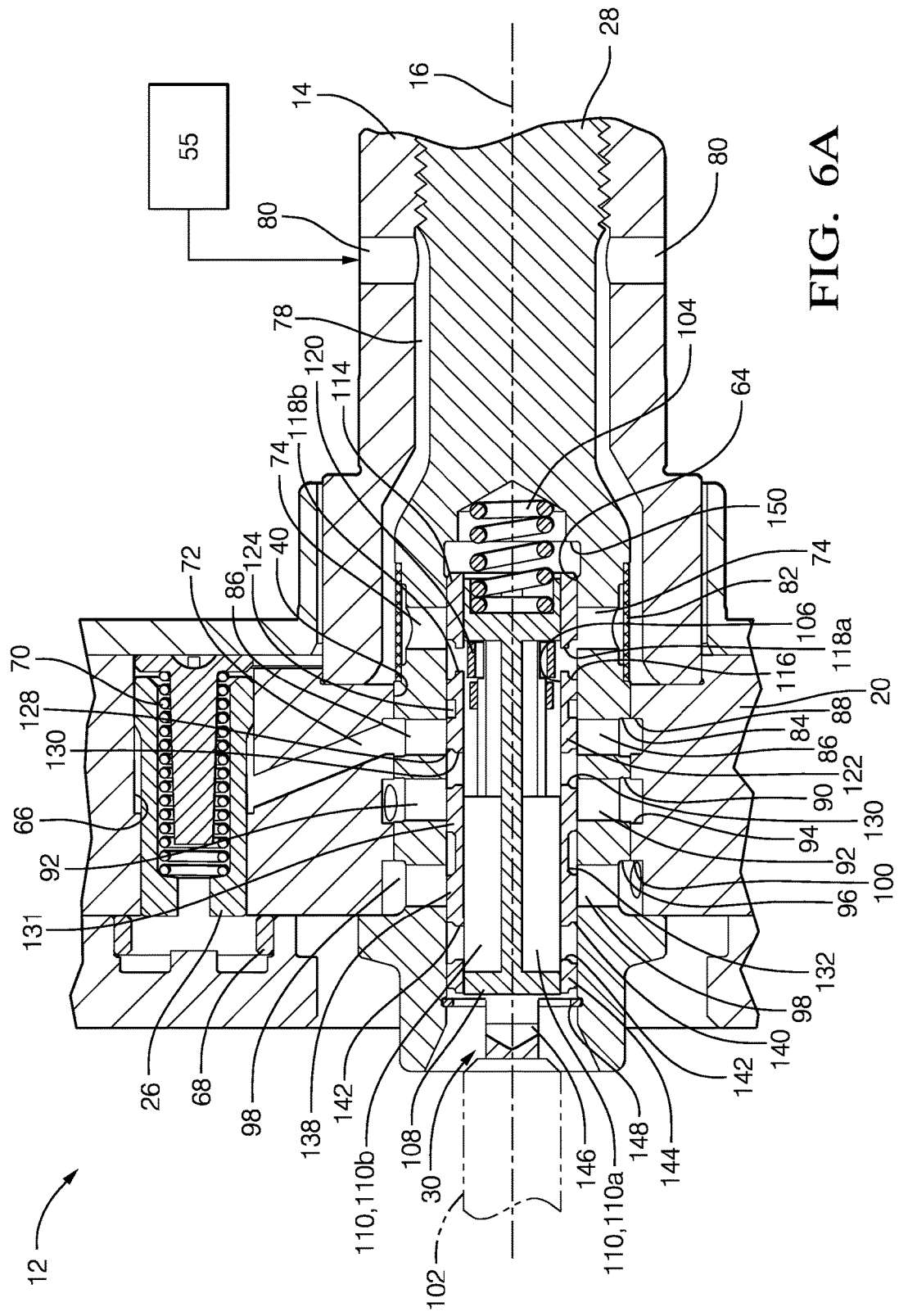
FIG. 6A is the view of FIG. 5A now shown with the valve spool in a retard position now with the lock pin retracted from the lock pin seat.
Figure 6B:
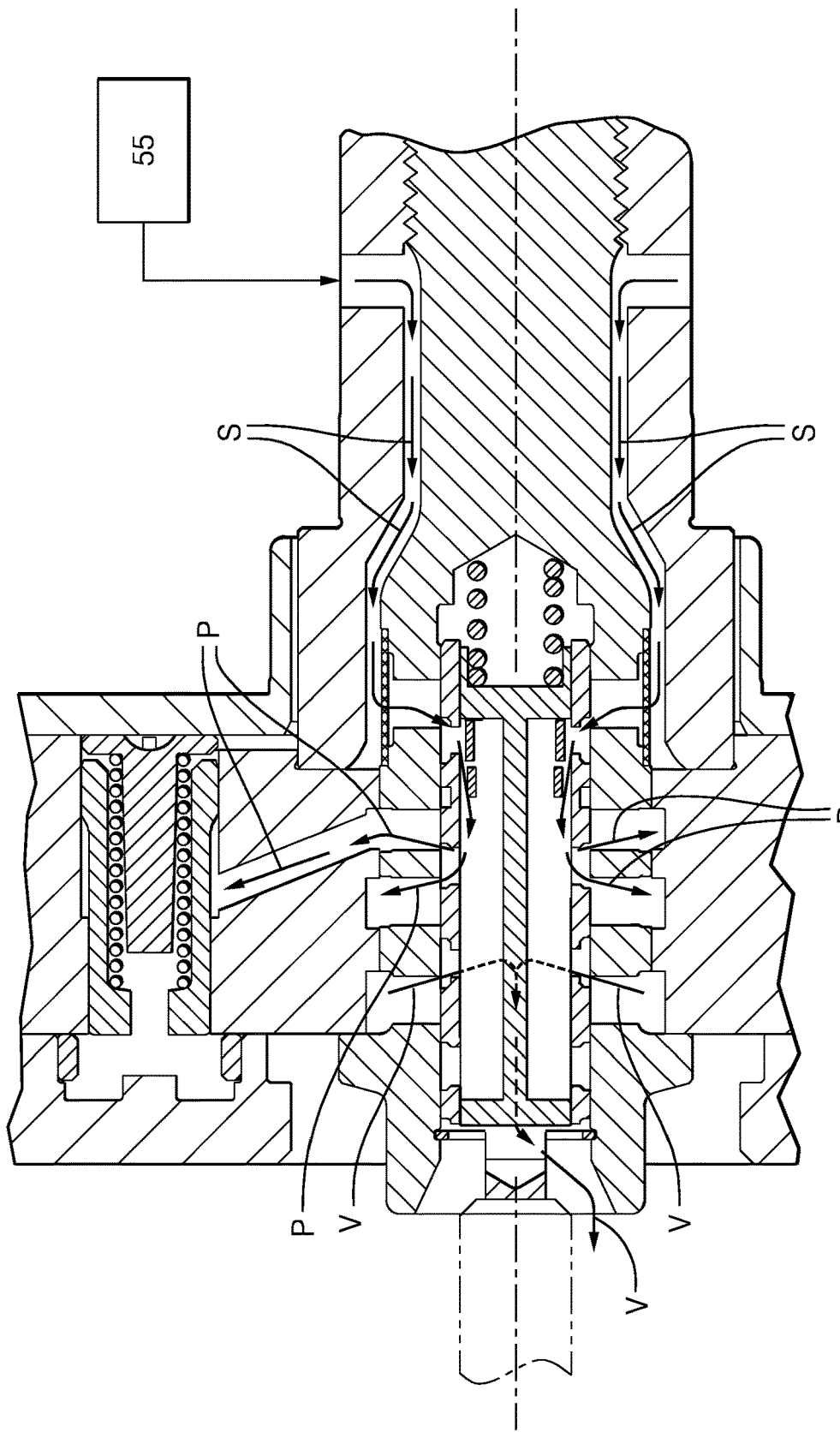
FIG. 6B is the view of FIG. 6A shown with reference numbers removed and arrows added in order to clearly show the path of travel of oil.

In a retard position, when an electric current of a first magnitude is supplied to actuator 102 as shown in FIGS. 6A and 6B, actuator 102 urges valve spool 30 in a direction toward valve spring 104 thereby causing valve spring 104 to be compressed slightly. In the retard position, supply land 114 is positioned to provide fluid communication between bolt supply passages 74 and spool annular supply groove 116, thereby allowing pressurized oil to be supplied to phasing volume 110 through spool supply passages 118a, 118b and supply check valve 120 from oil source 55. Also in the retard position, lock pin land 122 is positioned to prevent fluid communication between bolt lock pin passages 86 and spool annular lock pin groove 124, thereby preventing oil from being vented from lock pin bore 66. Also in the retard position, lock pin land 122 is positioned to permit fluid communication between bolt lock pin passages 86 and phasing volume 110, thereby allowing pressurized oil to be supplied to lock pin bore 66 via spool advance passage 130, spool annular advance groove 128, bolt lock pin passages 86, bolt annular lock pin groove 84, rotor annular lock pin groove 88, and rotor lock pin passage 72, and as a result, lock pin 26 compresses lock pin spring 70 and lock pin 26 is retracted from lock pin seat 68. Also in the retard position, advance land 131 is positioned to block fluid communication between bolt advance passages 92 and spool annular vent groove 132 while simultaneously permitting fluid communication between bolt advance passages 92 and phasing volume 110 via spool annular advance groove 128 and spool advance passage 130. Also in the retard position, retard land 138 is positioned to block fluid communication between phasing volume 110 and bolt retard passages 98 while simultaneously permitting fluid communication between bolt retard passages 98 and venting volume 112 via spool annular vent groove 132, and spool vent passage 134. In this way, pressurized oil that is supplied to phasing volume 110 from oil source 55 is supplied to advance chambers 42 via spool advance passage 130, spool annular advance groove 128, bolt advance passages 92, bolt annular advance groove 90, rotor annular advance groove 94, and rotor advance passages 56 while oil is simultaneously vented from retard chambers 44 via rotor retard passages 58, rotor annular retard groove 100, bolt annular retard groove 96, bolt retard passages 98, spool annular vent groove 132, spool vent passage 134, venting volume 112, and vent passages 146, thereby causing rotor 20 to rotate relative to stator 18 to cause a retard in timing of camshaft 14 relative to the crankshaft. In FIG. 6B, the reference numbers have been removed for clarity and arrows representing the path of travel of the oil have been included where arrows S represent oil from oil source 55 that is supplied to advance chambers 42 and to lock pin bore 66 and arrows V represent vented oil from retard chambers 44. It should be noted that FIG. 6B shows supply check valve 120 being open, but supply check valve 120 may also be closed if a torque reversal acting on camshaft 14 causes the pressure within phasing volume 110 to be greater than the pressure of oil from oil source 55.

Figure 7A:
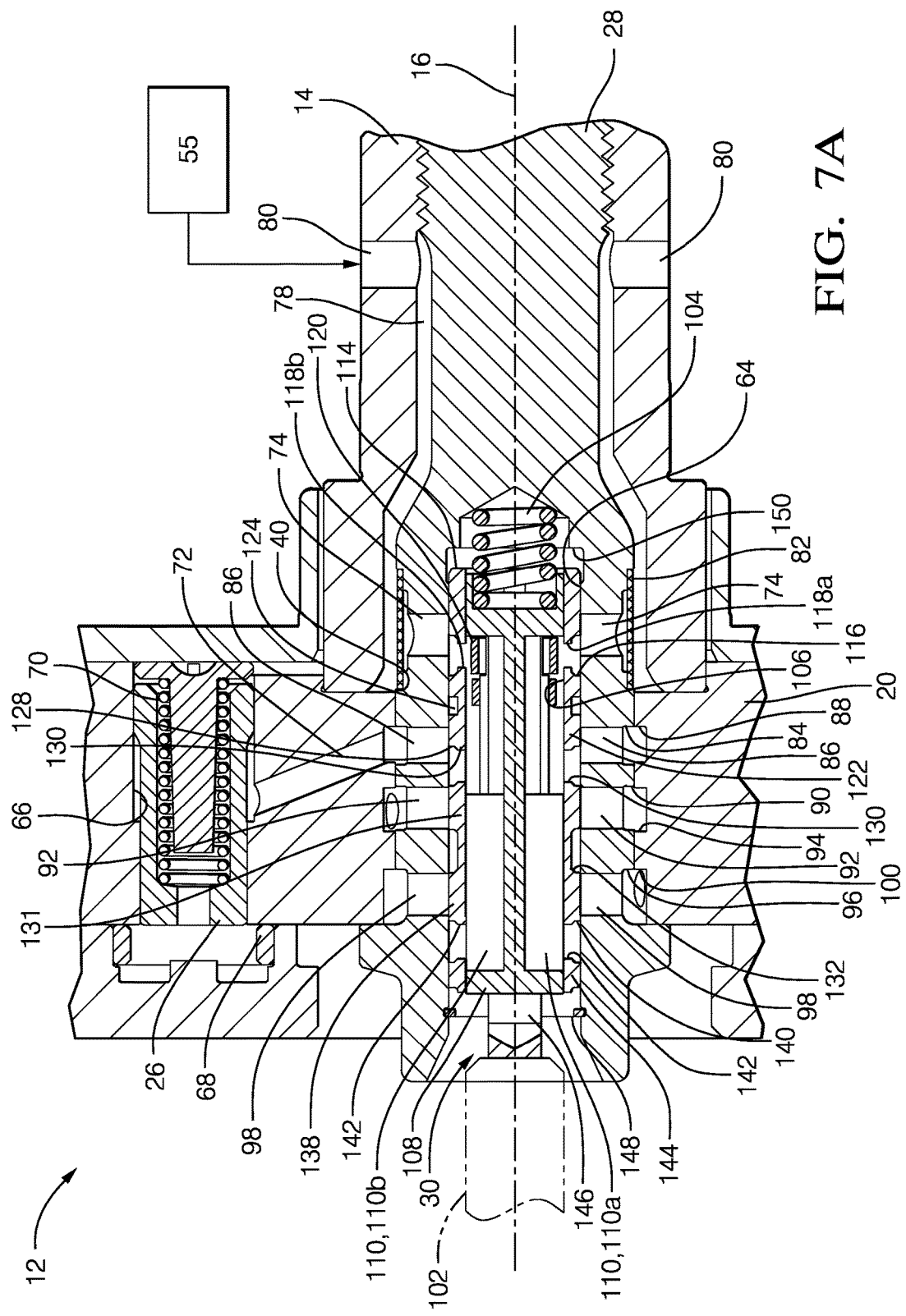
FIG. 7A is the view of FIG. 5A now shown with the valve spool in a hold position now with the lock pin retracted from the lock pin seat.
Figure 7B:
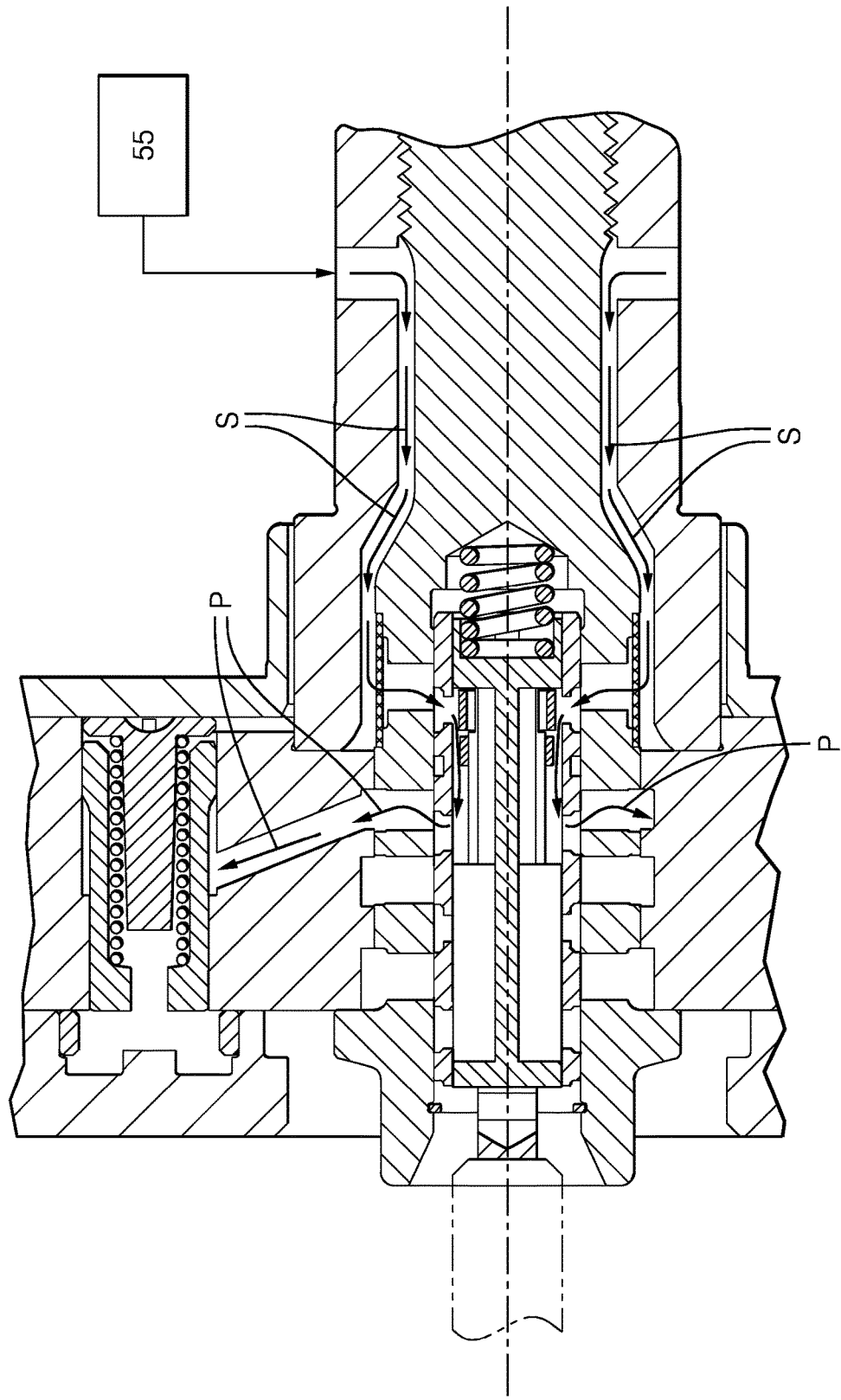
FIG. 7B is the view of FIG. 7A shown with reference numbers removed and arrows added in order to clearly show the path of travel of oil.

In a hold position, when an electric current of a second magnitude is supplied to actuator 102 as shown in FIGS. 7A and 7B, actuator 102 urges valve spool 30 in a direction toward valve spring 104 thereby causing valve spring 104 to be compressed slightly more than in the retard position. In the hold position, supply land 114 is positioned to provide fluid communication between bolt supply passages 74 and spool annular supply groove 116, thereby allowing pressurized oil to be supplied to phasing volume 110 through spool supply passages 118a,118b and supply check valve 120 from oil source 55. Also in the hold position, lock pin land 122 is positioned to prevent fluid communication between bolt lock pin passages 86 and spool annular lock pin groove 124, thereby preventing oil from being vented from lock pin bore 66. Also in the hold position, lock pin land 122 is positioned to permit fluid communication between bolt lock pin passages 86 and phasing volume 110, thereby allowing pressurized oil to be supplied to lock pin bore 66 via spool advance passage 130, spool annular advance groove 128, bolt lock pin passages 86, bolt annular lock pin groove 84, rotor annular lock pin groove 88, and rotor lock pin passage 72, and as a result, lock pin 26 compresses lock pin spring 70 and lock pin 26 is retracted from lock pin seat 68. Also in the hold position, advance land 131 is positioned to block fluid communication between bolt advance passages 92 and spool annular vent groove 132 while simultaneously permitting restricted communication between bolt advance passages 92 and phasing volume 110 via spool annular advance groove 128 and spool advance passage 130. Also in the hold position, retard land 138 is positioned to block fluid communication between bolt retard passages 98 and spool annular vent groove 132 while simultaneously permitting restricted fluid communication between bolt retard passages 98 and phasing volume 110 via spool annular retard groove 140 and spool retard passage 142. By providing restricted fluid communication between bolt advance passages 92 and phasing volume 110 and between bolt retard passages 98 and phasing volume 110 while simultaneously blocking fluid communication between bolt advance passages 92 and spool annular vent groove 132 and between bolt retard passages 98 and spool annular vent groove 132, the rotational position of rotor 20 and stator 18 is substantially maintained in the hold position. In FIG. 7B, the reference numbers have been removed for clarity and arrows representing the path of travel of the oil have been included where arrows S represent oil from oil source 55 which retracts lock pin 26 from lock pin seat 68 and which is supplied restrictingly to advance chambers 42 and retard chambers 44. It should be noted that FIG. 7B shows supply check valve 120 being open, but may typically remain closed unless lock pin 26 is in the process of being retracted from lock pin seat 68.

Figure 8A:
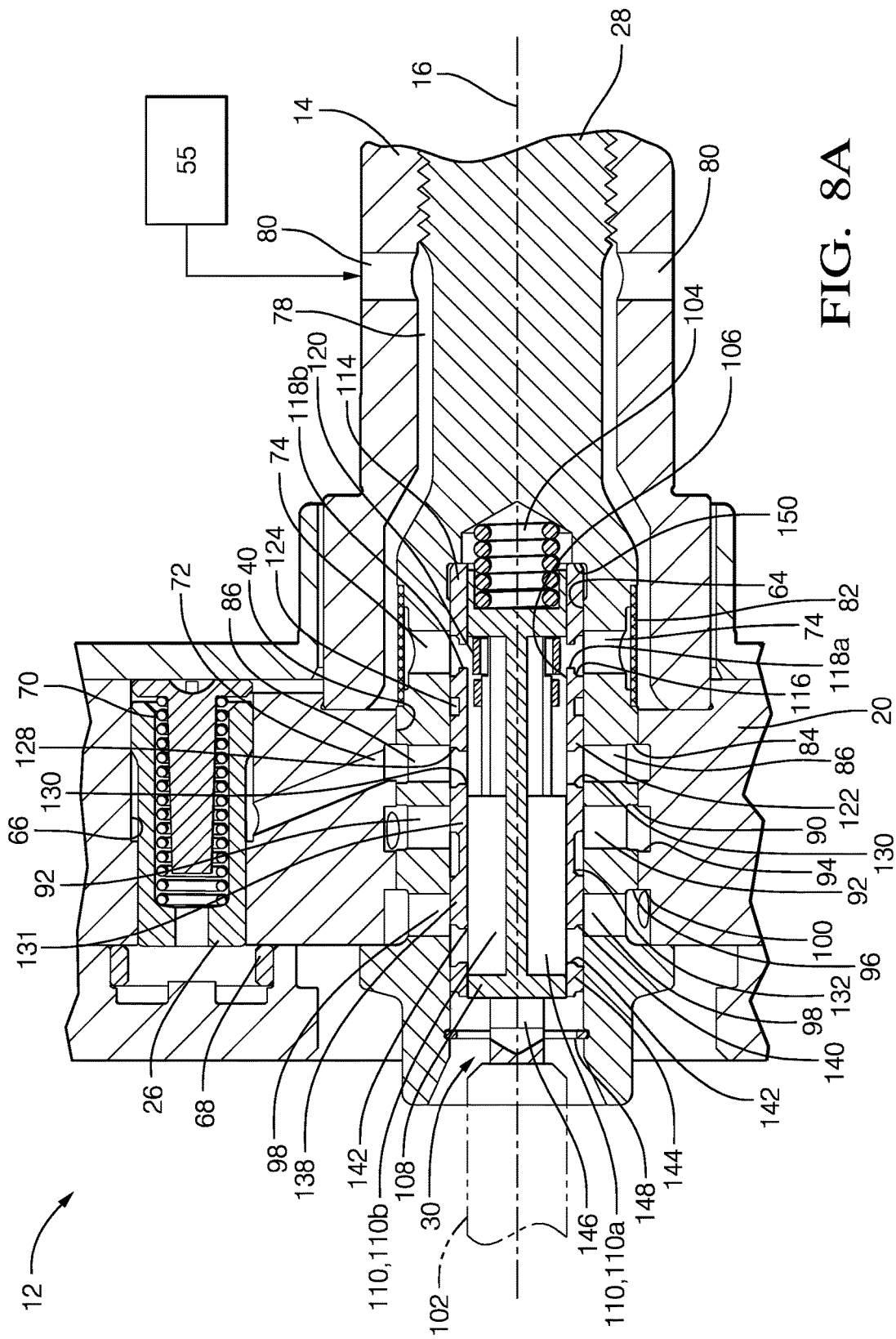
FIG. 8A is the view of FIG. 5A now shown with the valve spool in an advance position now with the lock pin retracted from the lock pin seat.
Figure 8B:
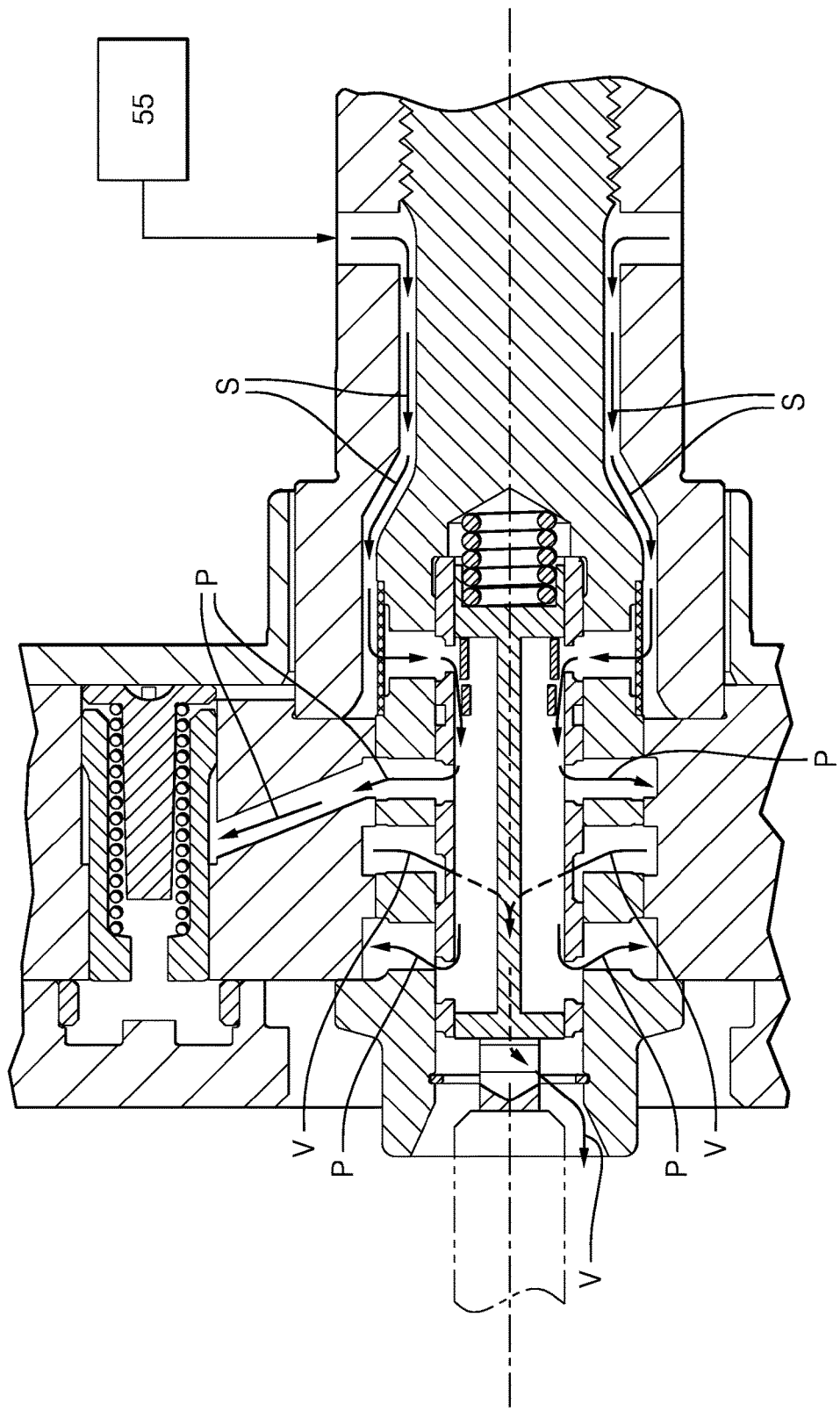
FIG. 8B is the view of FIG. 8A shown with reference numbers removed and arrows added in order to clearly show the path of travel of oil.

In an advance position, when an electric current of a third magnitude is supplied to actuator 102 as shown in FIGS. 8A and 8B, actuator 102 urges valve spool 30 in a direction toward valve spring 104 thereby causing valve spring 104 to be compressed slightly more than in the hold position until valve spool 30 abuts a second stop member 150, which may be, by way of non-limiting example only, a shoulder formed in valve bore 64. In the advance position, supply land 114 is positioned to provide fluid communication between bolt supply passages 74 and spool annular supply groove 116, thereby allowing pressurized oil to be supplied to phasing volume 110 through spool supply passages 118a,118b and supply check valve 120 from oil source 55. Also in the advance position, lock pin land 122 is positioned to prevent fluid communication between bolt lock pin passages 86 and spool annular lock pin groove 124, thereby preventing oil from being vented from lock pin bore 66. Also in the advance position, lock pin land 122 is positioned to permit fluid communication between bolt lock pin passages 86 and phasing volume 110, thereby allowing pressurized oil to be supplied to lock pin bore 66 via spool advance passage 130, spool annular advance groove 128, bolt lock pin passages 86, bolt annular lock pin groove 84, rotor annular lock pin groove 88, and rotor lock pin passage 72, and as a result, lock pin 26 compresses lock pin spring 70 and lock pin 26 is retracted from lock pin seat 68. Also in the advance position, advance land 131 is positioned to block fluid communication between phasing volume 110 and bolt advance passages 92 while simultaneously permitting fluid communication between bolt advance passages 92 and venting volume 112 via spool annular vent groove 132, and spool vent passage 134. Also in the advance position, retard land 138 is positioned to block fluid communication between bolt retard passages 98 and spool annular vent groove 132 while simultaneously permitting fluid communication between bolt retard passages 98 and phasing volume 110 via spool annular retard groove 140 and spool retard passage 142. In this way, pressurized oil that is supplied to phasing volume 110 from oil source 55 is supplied to retard chambers 44 via spool retard passage 142, spool annular retard groove 140, bolt retard passages 98, bolt annular retard groove 96, rotor annular retard groove 100, and rotor retard passages 58 while oil is simultaneously vented from advance chambers 42 via rotor advance passages 56, rotor annular advance groove 94, bolt advance passages 92, spool annular vent groove 132, spool vent passage 134, venting volume 112, and vent passages 146, thereby causing rotor 20 to rotate relative to stator 18 to cause an advance in timing of camshaft 14 relative to the crankshaft. In FIG. 8B, the reference numbers have been removed for clarity and arrows representing the path of travel of the oil have been included where arrows S represent oil from oil source 55 that is supplied to retard chambers 44 and lock pin bore 66 and arrows V represent vented oil from advance chambers 42. It should be noted that FIG. 8B shows supply check valve 120 being open, but supply check valve 120 may also be closed if a torque reversal acting on camshaft 14 causes the pressure within phasing volume 110 to be greater than the pressure of oil from oil source 55.

Figure 9:
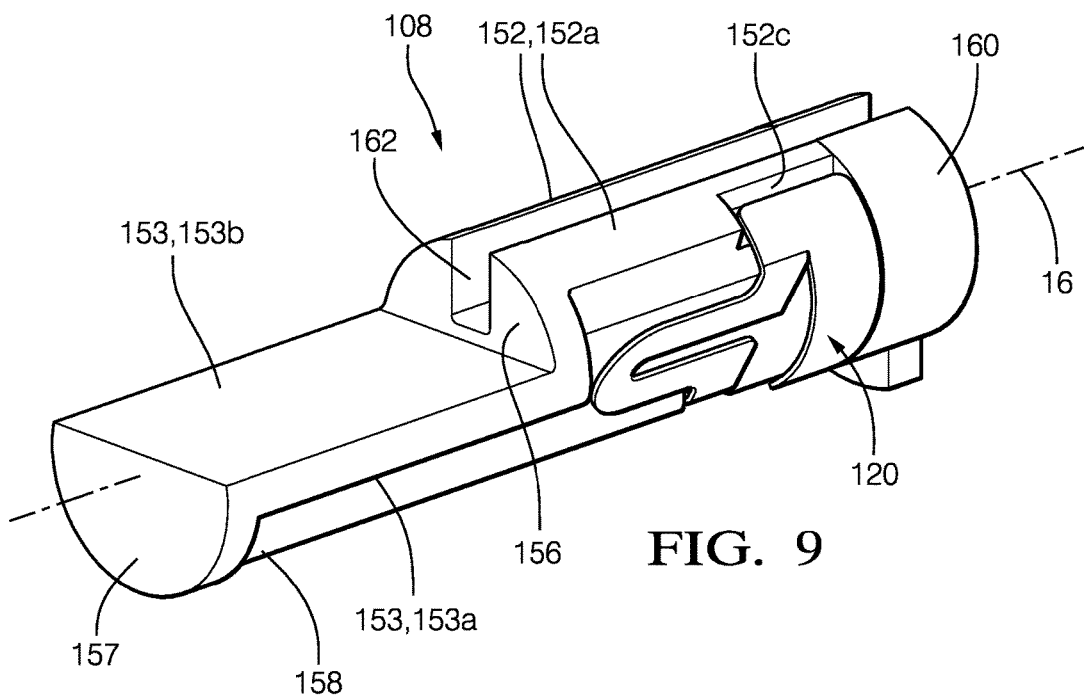
FIGS. 9 and 10 are isometric views of an insert of a valve spool of the camshaft phaser in accordance with the present invention.
Figure 10:
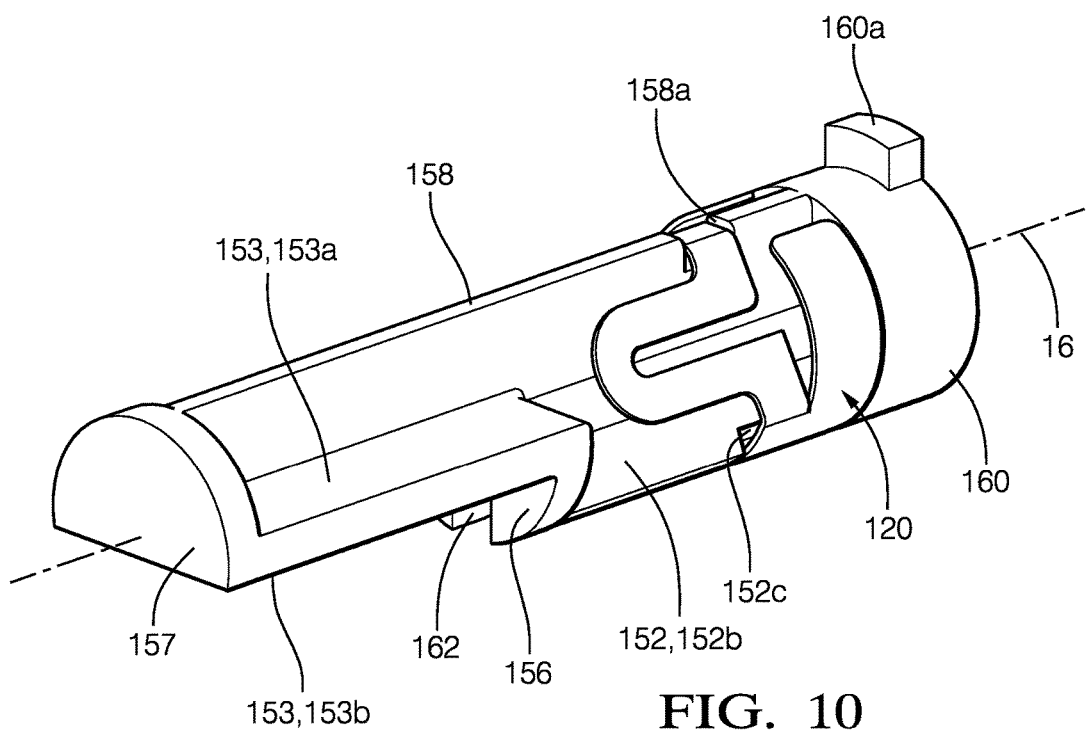
Figure 11:
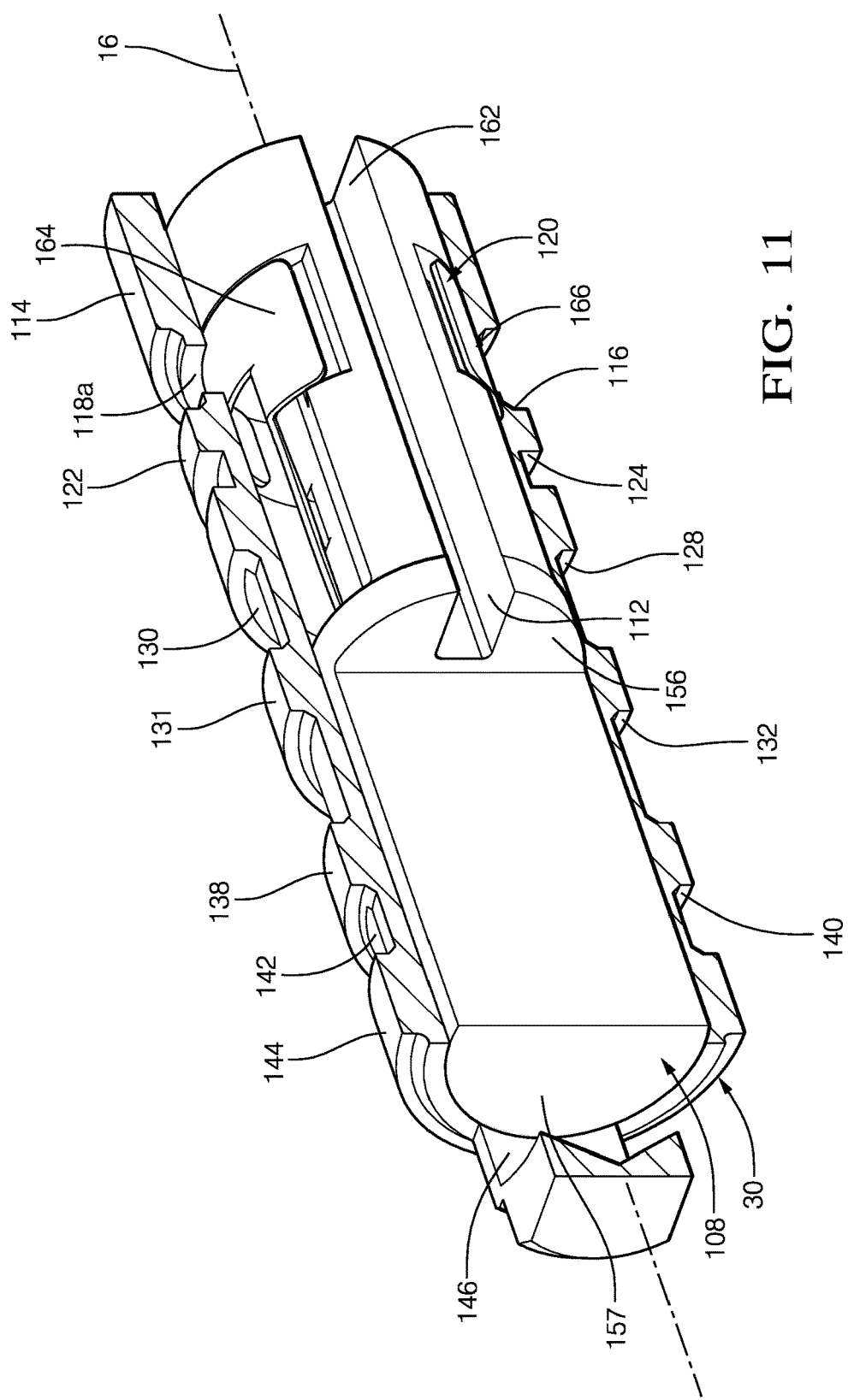
Figure 12:
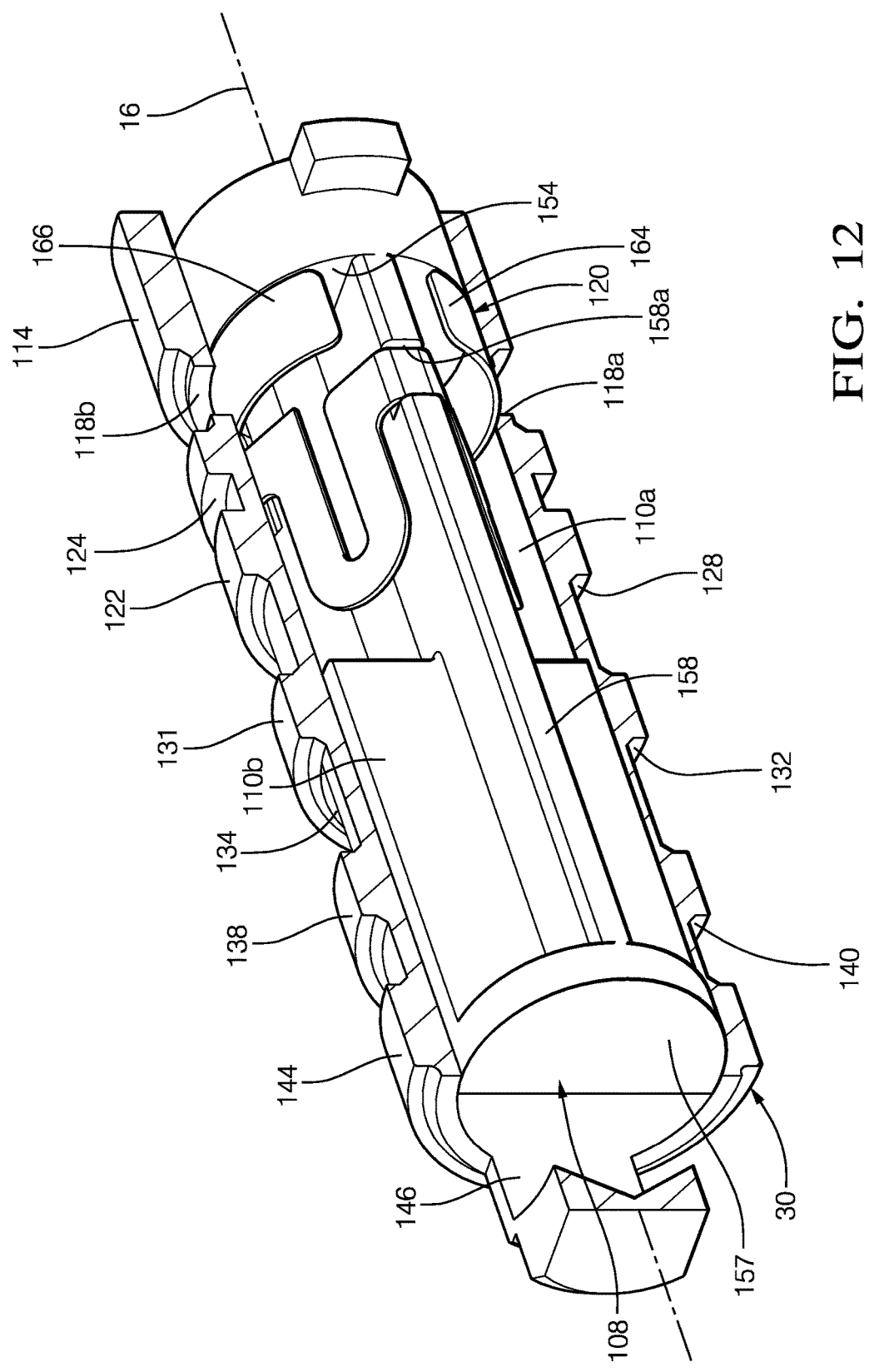

Insert 108 will now be describe with particular reference to FIGS. 9-12 where FIGS. 9 and 10 are isometric views of insert 108 and FIGS. 11 and 12 are isometric axial cross-sectional views of valve spool 30 and insert 108. Insert 108 is defined by an insert first sidewall 152 which extends axially within valve spool bore 106 and is also defined by an insert second sidewall 153 which extends axially within valve spool bore 106 such that insert first sidewall 152 and insert second sidewall 153 occupy distinct axial portions of valve spool bore 106. Insert first sidewall 152 is positioned to a side of valve spool bore 106 such that a first side 152a of insert first sidewall 152 faces toward and is contoured to mate sealingly with valve spool bore 106 while a second side 152b of insert first sidewall 152 which opposes first side 152a defines a portion of phasing volume 110 together with valve spool bore 106. Insert first sidewall 152 includes insert first sidewall recesses 152c which extend into second side 152b in order to accommodate opening of supply check valve 120 as will be described in greater detail later. Insert second sidewall 153 bifurcates valve spool bore 106 such that a first side 153a defines a portion of phasing volume 110 together with valve spool bore 106 and a second side 153b which opposes first side 153a defines a portion of venting volume 112 together with valve spool bore 106. Insert 108 is also defined by an insert first end wall 154 which traverses valve spool bore 106 in a direction substantially perpendicular to camshaft axis 16 such that insert first end wall 154 is contoured to sealing mate with valve spool bore 106. Insert 108 is also defined by an insert second end wall 156 which joins insert first sidewall 152 to insert second sidewall 153 such that insert second end wall 156 extends axially between insert first sidewall 152 and second sidewall 153 and such that insert first sidewall 152 joins insert first end wall 154 to insert second end wall 156. Insert second end wall 156 is contoured to mate sealingly with valve spool bore 106. Insert 108 is also defined by an insert third end wall 157 which extends from insert second sidewall 153 to valve spool bore 106 such that insert third end wall 157 is contoured to mate sealingly with valve spool bore 106. In this way, a portion of phasing volume 110 is defined axially between insert first end wall 154 and insert second end wall 156 and a portion of phasing volume 110 is defined axially between insert first end wall 154 and insert third end wall 157. Insert 108 may include an insert rib 158 which extends axially from insert first end wall 154 to insert second end wall 156 and from insert first end wall 154 to insert third end wall 157 such that insert rib 158 extends from insert first sidewall 152 toward valve spool bore 106 and from insert second sidewall 153, thereby bifurcating phasing volume 110 into first phasing volume 110a and second phasing volume 110b. Insert rib 158 provides support to insert first end wall 154, insert second end wall 156, and insert third end wall 157 in order to resist force created during times when phasing volume 110 is exposed to high pressure. Insert rib 158 may also include an insert rib positioning notch 158a which positions supply check valve 120 as will be described in greater detail later. Insert rib positioning notch 158a extends into the edge of insert rib 158 which faces toward valve spool bore 106 such that insert rib positioning notch 158a provides fluid communication between first phasing volume 110a and second phasing volume 110b, thereby preventing a pressure differential between first phasing volume 110a and second phasing volume 110b. An insert spring wall 160 extends axially from insert first end wall 154 in a direction that is opposite of insert first sidewall 152 such that insert spring wall 160 is hollow in order to receive a portion of valve spring 104 therein. In this way, one end of valve spring 104 mates with insert first end wall 154 and is maintained in a centered relationship about camshaft axis 16 by insert spring wall 160. In order to provide proper orientation of insert 108 within valve spool bore 106, insert spring wall 160 may include an alignment tab 160a which is received within a complementary spool alignment notch (not shown) in valve spool 30. An insert slot 162 extends axially along insert 108 such that insert slot 162 extends along insert spring wall 160, insert first end wall 154, first side 152a of insert first sidewall 152, and insert second end wall 156. In this way, a portion of venting volume 112 is defined between insert slot 162 and valve spool bore 106 while, as described previously, a portion of venting volume 112 is defined between insert second sidewall 153 and valve spool bore 106. It should be noted that since insert second sidewall 153 bifurcates valve spool bore 106, the portions of phasing volume 110 and venting volume 112 have substantially the same cross-sectional areas when sectioned by a plane that is perpendicular to camshaft axis 16. As used herein, the cross-sectional areas of phasing volume 110 and venting volume 112 may differ by about 10% or less while still being considered to be substantially the same. It should also be noted that spool supply passages 118a,118b are aligned along camshaft axis 16 with the portion of phasing volume 110 that is defined by insert first sidewall 152, that spool advance passage 130 is aligned along camshaft axis 16 with the portion of phasing volume 110 that is defined by insert first sidewall 152, that spool vent passage 134 is aligned along camshaft axis 16 with the portion of venting volume 112 that is defined by insert second sidewall 153, and that spool retard passage 142 is aligned along camshaft axis 16 with the portion of venting volume 112 that is defined by insert second sidewall 153.

Figure 13:
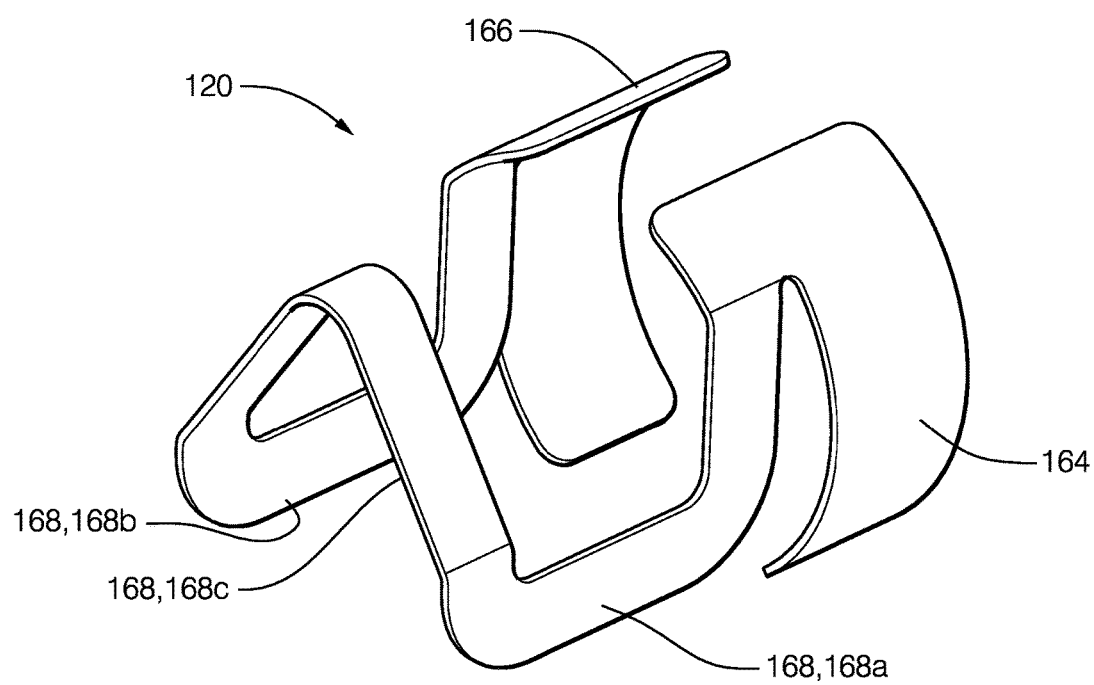
FIG. 13 is an isometric view of a supply check valve of the camshaft phaser in accordance with the present invention.
Figure 14:
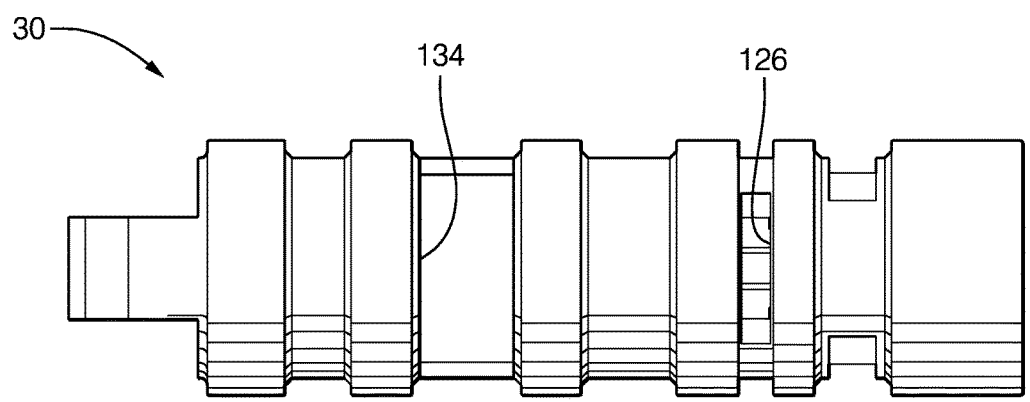
FIG. 14 is an elevation view of the valve spool.

Supply check valve 120 will now be described with particular reference to FIG. 13. Supply check valve 120 includes a first check valve member 164 and a second check valve member 166 such that first check valve member 164 is located within first phasing volume 110a and second check valve member 166 is located within second phasing volume 110b and such that first check valve member 164 is diametrically opposed to second check valve member 166 within valve spool bore 106. First check valve member 164 and second check valve member 166 are each arcuate in shape in order to match the curvature of valve spool bore 106 and are sized to selectively block respective spool supply passages 118a, 118b. Supply check valve 120 also includes a biasing section 168 which joins first check valve member 164 and second check valve member 166. Biasing section 168 is resilient and compliant in order to bias first check valve member 164 and second check valve member 166 into contact with valve spool bore 106 while allowing first check valve member 164 and second check valve member 166 to be displaced inward under operating conditions as described previously which require flow into phasing volume 110 through spool supply passages 118a, 118b. Biasing section 168 includes a biasing section first leg 168a which extends axially from first check valve member 164 within first phasing volume 110a, a biasing section second leg 168b which extends axially from second check valve member 166 within second phasing volume 110b, and a biasing section bridge 168c which joins biasing section first leg 168a and biasing section second leg 168b such that biasing section bridge 168c is axially spaced from first check valve member 164 and from second check valve member 166. Biasing section bridge 168c passes between first phasing volume 110a and second phasing volume 110b through insert rib positioning notch 158a. Biasing section bridge 168c and insert rib positioning notch 158a are sized to maintain the axial position of supply check valve 120 within phasing volume 110 to ensure that first check valve member 164 and second check valve member 166 are properly positioned to block respective spool supply passages 118a, 118b when first check valve member 164 and second check valve member 166 are biased into contact with valve spool bore 106. It should be noted that when first check valve member 164 and second check valve member 166 are opened by oil pressure, first check valve member 164 and second check valve member 166 are each received within a respective insert first sidewall recess 152c. As shown, supply check valve 120 may be a simple one-piece device that is made of formed sheet metal.

Figure 2:
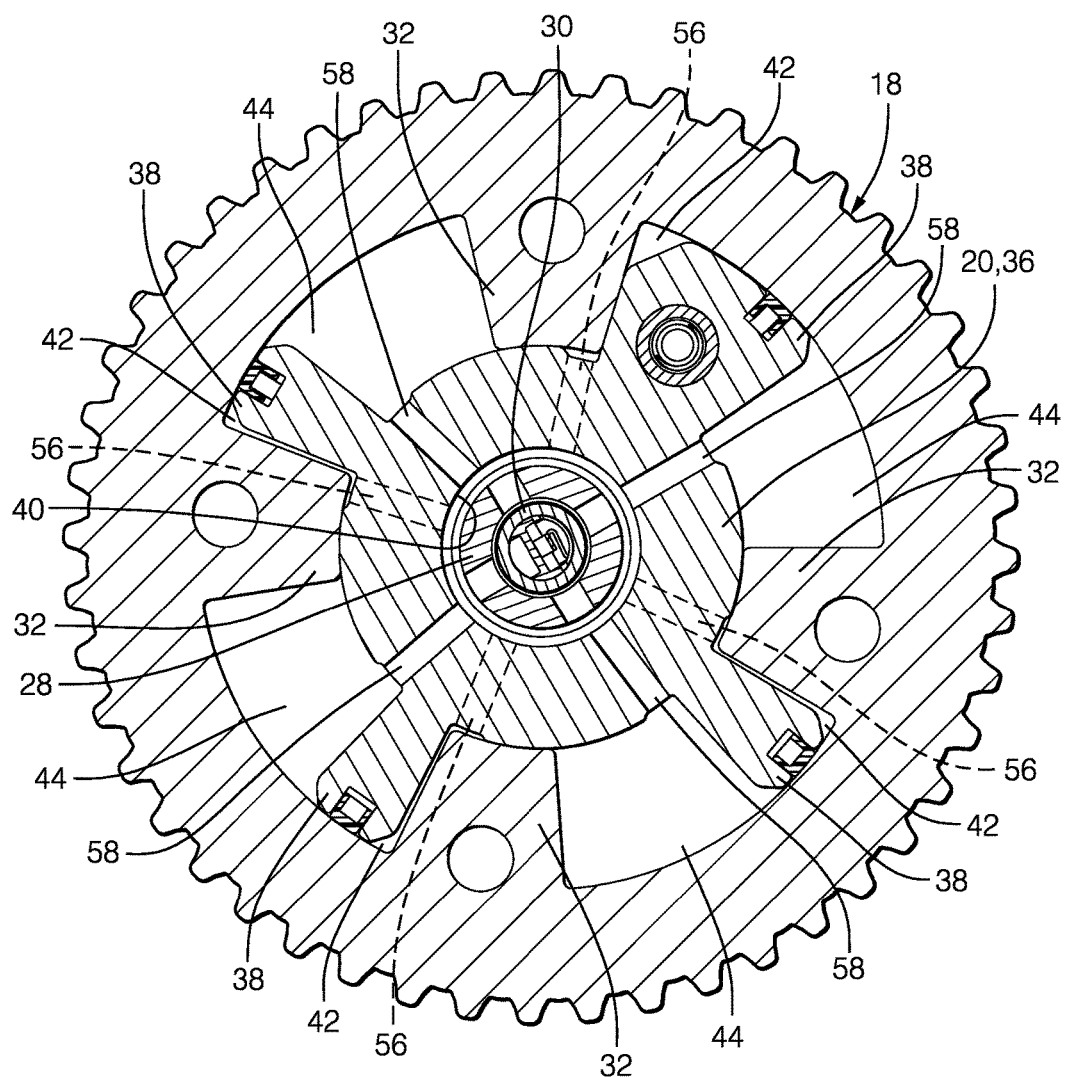
FIG. 2 is a radial cross-sectional view of the camshaft phaser in accordance with the present invention.
Figure 3:
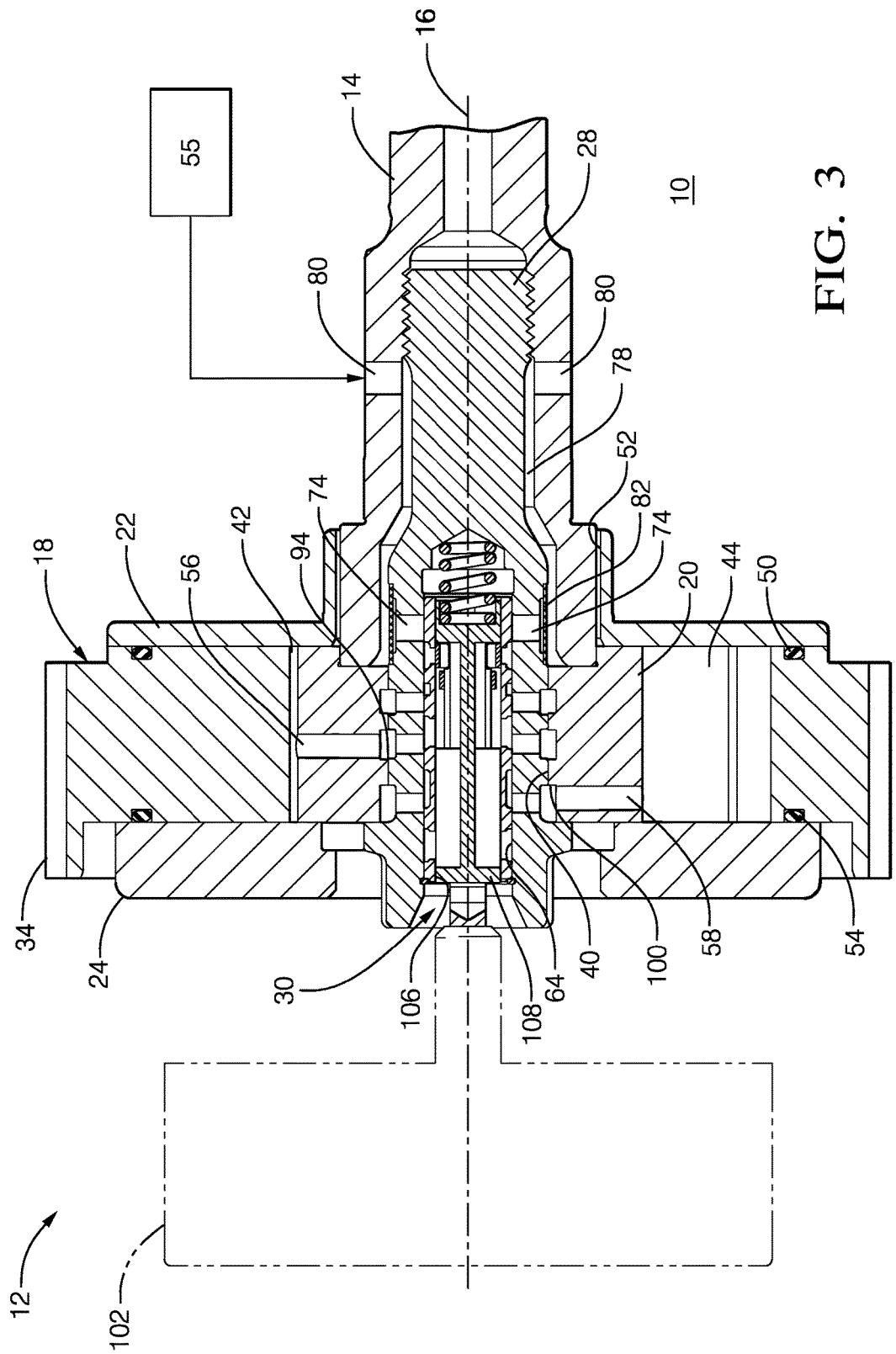
FIG. 3. is a cross-sectional view of the camshaft phaser in accordance with the present invention taken through advance and retard passages of a rotor of the camshaft phaser.
Figure 4:
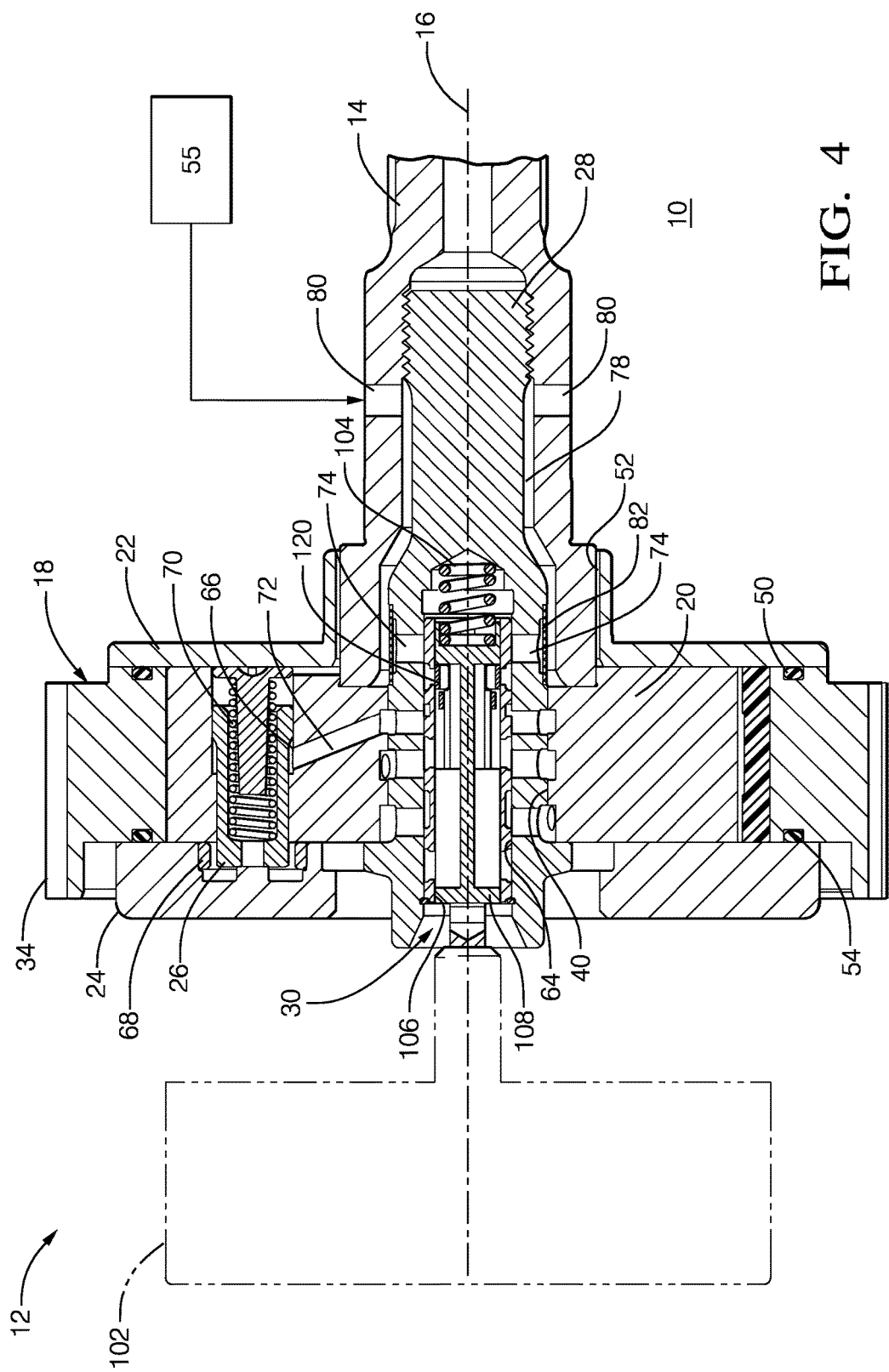
FIG. 4. is a cross-sectional view of the camshaft phaser in accordance with the present invention taken through a lock pin of the camshaft phaser.

While camshaft phaser 12 has been described as defaulting to full advance, it should now be understood that camshaft phaser 12 may alternatively default to full retard by simply rearranging oil passages. Similarly, while full advance has been described as full counterclockwise rotation of rotor 20 within stator 18 as shown in FIG. 2, it should also now be understood that full advance may alternatively be full clockwise rotation of rotor 20 within stator 18 depending on whether camshaft phaser 12 is mounted to the front of internal combustion engine 10 (shown in the figures) or to the rear of internal combustion engine 10.

While camshaft phaser attachment bolt 28 has been described herein as including grooves on the outer periphery thereof which are aligned with corresponding grooves formed in rotor central through bore 40 of rotor 20, it should now be understood that the grooves on camshaft phaser attachment bolt 28 could be omitted and the grooves formed in rotor central through bore 40 could be used to serve the same function. Similarly, the grooves formed in rotor central through bore 40 could be omitted and the grooves on camshaft phaser attachment bolt 28 could be used to serve the same function.

Valve spool 30, insert 108, and supply check valve 120 as described herein allow for simplified construction of camshaft phaser 12 compared to the prior art. Furthermore, supplying oil to lock pin 26 from phasing volume 110 eliminates the need for an additional groove in valve spool 30 and an additional groove between camshaft phaser attachment bolt 28 and rotor central through bore 40 to create a separate supply for lock pin 26. Moreover, insert 108 accommodates spool supply passages 118a,118b which are diametrically opposed. The diametrically opposed nature of spool supply passages 118a,118b accommodates greater flow while being able to utilize a check valve that is simple and economical to implement. Another advantage of insert 108 is that by insert second sidewall 153 bifurcating valve spool bore 106 and by spool vent passage 134 being aligned along camshaft axis 16 with the portion of venting volume 112 that is defined by insert second sidewall 153, the flow of oil being vented can match the flow of oil being supplied, thereby increasing the phasing rate of camshaft phaser 12.

While this invention has been described in terms of preferred embodiments thereof, it is not intended to be so limited, but rather only to the extent set forth in the claims that follow.

We claim:

1. A camshaft phaser for use with an internal combustion engine for controllably varying the phase relationship between a crankshaft and a camshaft in said internal combustion engine, said camshaft phaser comprising:
    an input member connectable to said crankshaft of said internal combustion engine to provide a fixed ratio of rotation between said input member and said crankshaft;
    an output member connectable to said camshaft of said internal combustion engine and defining an advance chamber and a retard chamber with said input member;
    a valve spool moveable along an axis between an advance position and a retard position and having a valve spool bore with a phasing volume and a venting volume defined within said valve spool bore such that said phasing volume is fluidly segregated from said venting volume, said valve spool having a first spool supply passage and a second spool supply passage which is diametrically opposed to said first spool supply passage such that said first spool supply passage and said second spool supply passage each provide a path for pressurized oil to be supplied to said phasing volume from an oil source; and
    a supply check valve within said valve spool bore which allows oil to flow to said phasing volume from said oil source while preventing oil from flowing from said phasing volume to said oil source;
    wherein oil is supplied to said advance chamber from said phasing volume and oil is vented from said retard chamber to said venting volume in order to retard the timing of said camshaft relative to said crankshaft;
    wherein oil is supplied to said retard chamber from said phasing volume and oil is vented from said advance chamber to said venting volume in order to advance the timing of said camshaft relative to said crankshaft; and
    wherein said supply check valve is disposed within said phasing volume.

2. A camshaft phaser for use with an internal combustion engine for controllably varying the phase relationship between a crankshaft and a camshaft in said internal combustion engine, said camshaft phaser comprising:
    an input member connectable to said crankshaft of said internal combustion engine to provide a fixed ratio of rotation between said input member and said crankshaft;
    an output member connectable to said camshaft of said internal combustion engine and defining an advance chamber and a retard chamber with said input member;
    a valve spool moveable along an axis between an advance position and a retard position and having a valve spool bore with a phasing volume and a venting volume defined within said valve spool bore such that said phasing volume is fluidly segregated from said venting volume, said valve spool having a first spool supply passage and a second spool supply passage which is diametrically opposed to said first spool supply passage such that said first spool supply passage and said second spool supply passage each provide a path for pressurized oil to be supplied to said phasing volume from an oil source; and a supply check valve within said valve spool bore which allows oil to flow to said phasing volume from said oil source while preventing oil from flowing from said phasing volume to said oil source;

wherein oil is supplied to said advance chamber from said phasing volume and oil is vented from said retard chamber to said venting volume in order to retard the timing of said camshaft relative to said crankshaft;

wherein oil is supplied to said retard chamber from said phasing volume and oil is vented from said advance chamber to said venting volume in order to advance the timing of said camshaft relative to said crankshaft; and wherein said supply check valve comprises:
a first check valve member which allows oil to enter said phasing volume through said first spool supply passage and which prevents oil from exiting said phasing volume through said first spool supply passage; and a second check valve member diametrically opposed to said first check valve member which allows oil to enter said phasing volume through said second spool supply passage and which prevents oil from exiting said phasing volume through said second spool supply passage.

3. A camshaft for use with an internal combustion engine for controllably varying the phase relationship between a crankshaft and a camshaft in said internal combustion engine, said camshaft phaser comprising:

an input member connectable to said crankshaft of said internal combustion engine to provide a fixed ratio of rotation between said input member and said crankshaft;

an output member connectable to said camshaft of said internal combustion engine and defining an advance chamber and a retard chamber with said input member;

a valve spool moveable along an axis between an advance position and a retard position and having a valve spool bore with a phasing volume and a venting volume defined within said valve spool bore such that said phasing volume is fluidly segregated from said venting volume, said valve spool having a first spool supply passage and a second spool supply passage which is diametrically opposed to said first spool supply passage such that said first spool supply passage and said second spool supply passage each provide a path for pressurized oil to be supplied to said phasing volume from an oil source; and a supply check valve within said valve spool bore which allows oil to flow to said phasing volume from said oil source while preventing oil from flowing from said phasing volume to said oil source;

wherein oil is supplied to said advance chamber from said phasing volume and oil is vented from said retard chamber to said venting volume in order to retard the timing of said camshaft relative to said crankshaft;

wherein oil is supplied to said retard chamber from said phasing volume and oil is vented from said advance chamber to said venting volume in order to advance the timing of said camshaft relative to said crankshaft;

wherein said phasing volume and said venting volume are defined by an insert that is disposed within said valve spool bore; and wherein said insert comprises:
an insert first end wall;
an insert second end wall spaced axially from said insert first end wall;
an insert third end wall spaced axially from said insert second end wall such that said insert second end wall is axially between said insert first end wall and said insert third end wall;
an insert first sidewall between said insert first end wall and said insert second end wall such that that said insert first sidewall connects said insert first end wall to said insert second end wall; and
an insert second sidewall between said insert second end wall and said insert third end wall such that said insert second sidewall connects said insert second end wall to said insert third end wall and such that said insert second sidewall is offset relative to said insert first sidewall in a direction perpendicular to said axis.

4. A camshaft phaser as in claim 3 wherein said phasing volume is defined axially between said insert first end wall and said insert second end wall and is also defined axially between said insert second end wall and said insert third end wall.

5. A camshaft phaser as in claim 3 wherein said first spool supply passage and said second spool supply passage are aligned with said insert first sidewall along said axis.

6. A camshaft phaser as in claim 3 wherein:
said valve spool has a spool advance passage which provides a path for pressurized oil to be supplied to said advance chamber from said phasing volume in order to retard the timing of said camshaft relative to said crankshaft, said spool advance passage being aligned with said insert first sidewall along said axis;
said valve spool has a spool vent passage which provides a path for oil to vent from said retard chamber to said venting volume in order to retard the timing of said camshaft relative to said crankshaft and which also provides a path for oil to vent from said advance chamber to said venting volume in order to advance the timing of said camshaft relative to said crankshaft, said spool vent passage being aligned with said insert second sidewall along said axis; and
said valve spool has a spool retard passage which provides a path for pressurized to be supplied to said retard chamber from said phasing volume in order to advance the timing of said camshaft relative to said crankshaft, said spool retard passage being aligned with said insert second sidewall along said axis.

7. A camshaft phaser as in claim 3 wherein said insert second sidewall bifurcates said valve spool bore.

8. A camshaft phaser as in claim 3 wherein said insert further comprises an insert rib which connects said insert first end wall to said insert second end wall and which also connects said insert first end wall to said insert third end wall, said insert rib extending from said insert first sidewall into said phasing volume and also extending from said insert second sidewall into said phasing volume, thereby bifurcating said phasing volume into a first phasing volume and a second phasing volume.

9. A camshaft phaser as in claim 8 wherein said supply check valve comprises:
a first check valve member within said first phasing volume which allows oil to enter said phasing volume through said first spool supply passage and which prevents oil from exiting said phasing volume through said first spool supply passage; and
a second check valve member within said second phasing volume and diametrically opposed to said first check valve member such that said second check valve member allows oil to enter said phasing volume through said second spool supply passage and such that said second check valve member prevents oil from exiting said phasing volume through said second spool supply passage.

10. A camshaft phaser as in claim 9 wherein said insert first sidewall has insert first sidewall recesses which accommodate said first check valve member and said second check valve member when said first check valve member allows oil to flow into said phasing volume and when said second check valve member allows oil to flow into said phasing volume.

11. A camshaft phaser as in claim 3 wherein said supply check valve comprises:
a first check valve member within said phasing volume which allows oil to enter said phasing volume through said first spool supply passage and which prevents oil from exiting said phasing volume through said first spool supply passage;
a second check valve member within said phasing volume and diametrically opposed to said first check valve member such that said second check valve member allows oil to enter said phasing volume through said second spool supply passage and such that said second check valve member prevents oil from exiting said phasing volume through said second spool supply passage; and
a biasing section which joins said first check valve member and said second check valve member, said biasing section being resilient and compliant such that said biasing section biases said first check valve member to block said first spool supply passage and such that said biasing section biases said second check valve member to block said second spool supply passage.

12. A camshaft phaser as in claim 11 wherein said biasing section comprises:
a biasing section first leg which extends axially from said first check valve member;
a biasing section second leg which extends axially from said second check valve member; and
a biasing section bridge which joins said biasing section first leg and said biasing section second leg such that said biasing section bridge is axially spaced from said first check valve member and from said second check valve member.

13. A camshaft phaser as in claim 12 wherein said insert further comprises an insert rib which connects said insert first end wall to said insert second end wall and which also connects said insert first end wall to said insert third end wall, said insert rib extending from said insert first sidewall into said phasing volume and also extending from said insert second sidewall into said phasing volume, thereby bifurcating said phasing volume into a first phasing volume and a second phasing volume.

14. A camshaft phaser as in claim 13 wherein said insert rib has an insert rib positioning notch through which said biasing section bridge passes from said first phasing volume to said second phasing volume.

15. A camshaft phaser as in claim 14 wherein said insert rib positioning notch axially positions said supply check valve within said phasing volume.

16. A camshaft phaser for use with an internal combustion engine for controllably varying the phase relationship between a crankshaft and a camshaft in said internal combustion engine, said camshaft phaser comprising:

an input member connectable to said crankshaft of said internal combustion engine to provide a fixed ratio of rotation between said input member and said crankshaft;
an output member connectable to said camshaft of said internal combustion engine and defining an advance chamber and a retard chamber with said input member;
a valve spool moveable along an axis between an advance position and a retard position and having a valve spool bore with a phasing volume and a venting volume defined within said valve spool bore such that said phasing volume is fluidly segregated from said venting volume, said valve spool having a first spool supply passage and a second spool supply passage which is diametrically opposed to said first spool supply passage such that said first spool supply passage and said second spool supply passage each provide a path for pressurized oil to be supplied to said phasing volume from an oil source;
a supply check valve within said valve spool bore which allows oil to flow to said phasing volume from said oil source while preventing oil from flowing from said phasing volume to said oil source; and
a lock pin which selectively engages a lock pin seat, wherein pressurized oil supplied to said lock pin causes said lock pin to retract from said lock pin seat to permit relative movement between said input member and said output member and wherein venting oil from said lock pin allows said lock pin to engage said lock pin seat in order to prevent relative motion between said input member and said output member at a predetermined aligned position;
wherein oil is supplied to said advance chamber from said phasing volume and oil is vented from said retard chamber to said venting volume in order to retard the timing of said camshaft relative to said crankshaft;
wherein oil is supplied to said retard chamber from said phasing volume and oil is vented from said advance chamber to said venting volume in order to advance the timing of said camshaft relative to said crankshaft; and
wherein said phasing volume and said venting volume are defined by an insert that is disposed within said valve spool bore.

17. A camshaft phaser as in claim 16 wherein:
said valve spool is also moveable between a default position and said advance position and said retard position; and
said default position allows oil to be vented from said lock pin.

18. A camshaft phaser as in claim 17 wherein said advance position and said retard position allow pressurized oil to be supplied to said lock pin.

19. A camshaft phaser as in claim 18 wherein said advance position and said retard position allow pressurized oil to be supplied to said lock pin from said phasing volume.

20. A camshaft phaser as in claim 17 wherein oil vented from said lock pin is vented through said venting volume of said valve spool bore.

21. A camshaft phaser as in claim 16 wherein said insert comprises:
an insert first end wall;
an insert second end wall spaced axially from said insert first end wall;
an insert third end wall spaced axially from said insert second end wall such that said insert second end wall is axially between said insert first end wall and said insert second end wall;

an insert first sidewall between said insert first end wall and said insert second end wall such that that said insert first sidewall connects said insert first end wall to said insert second end wall; and an insert second sidewall between said insert second end wall and said insert third end wall such that said insert second sidewall connects said insert second end wall to said insert third end wall and such that said insert second sidewall is offset relative to said insert first sidewall in a direction perpendicular to said axis;

wherein said venting volume is defined in part by an insert slot which extends axially along said insert first end wall, said insert first sidewall, and said insert second end wall and is also defined in part by said insert second sidewall.

* * * * *